United States Patent [19]

Peralta et al.

[11] 3,967,737

[45] July 6, 1976

[54] DEPALLETIZING AND PALLET STACKING APPARATUS

[75] Inventors: Roberto S. Peralta, Chicago;
Torrance L. Duffy, II, Evanston;
Raymond E. Derflinger, Chicago, all of Ill.

[73] Assignee: Conveyor Systems, Inc., Morton Grove, Ill.

[22] Filed: Aug. 19, 1974

[21] Appl. No.: 498,320

[52] U.S. Cl. .............................. 214/1 BB; 214/6 P; 214/8.5 C; 294/63 R
[51] Int. Cl.² ........................................ B65G 59/02
[58] Field of Search ............... 214/1 BB, 6 P, 8.5 R, 214/8.5 A, 8.5 C; 294/63 R, 67 BB

[56] References Cited
UNITED STATES PATENTS

| | | | |
|---|---|---|---|
| 2,980,265 | 4/1961 | Johnson et al. | 214/8.5 C X |
| 3,319,760 | 5/1967 | Sheldon et al. | 214/8.5 C X |
| 3,534,872 | 10/1970 | Roth et al. | 214/8.5 C |
| 3,543,949 | 12/1970 | Weier | 214/1 BB X |
| 3,687,306 | 8/1972 | Ransom | 214/8.5 C |
| 3,869,049 | 3/1975 | Selusnik | 214/8.5 A |

*Primary Examiner*—L. J. Paperner
*Attorney, Agent, or Firm*—Wallenstein, Spangenberg, Hattis & Strampel

[57] ABSTRACT

A depalletizer and pallet stacking system includes an inlet station which an elevatable U-shaped loaded pallet support frame which permits a forklift unit to be lowered to deposit a loaded pallet with tiers of articles thereon. The loaded pallet support frame rises in steps to move the remaining uppermost tier of articles opposite the inlet end of an elevated horizontally extending conveyor. A shuttle carriage supported above the inlet station carries article gripping units each of which includes horizontally spaced article end hunting clamping members which come together to clamp an associated row of articles of widely varying size with the corresponding articles in the various rows being preferably laterally aligned. The shuttle carriage sequentially delivers each uppermost tier of articles to the inlet end of the conveyor, and the loaded pallet support means then lowers to deliver the empty pallet upon a pallet stacking support means which has been moved into an extended position to receive the pallet. The pallet stacking support means then retracts to a position below the inlet end of the conveyor and upon subsequent return extended to its position drops the pallet thereon upon a stack of empty pallets therebelow.

13 Claims, 19 Drawing Figures

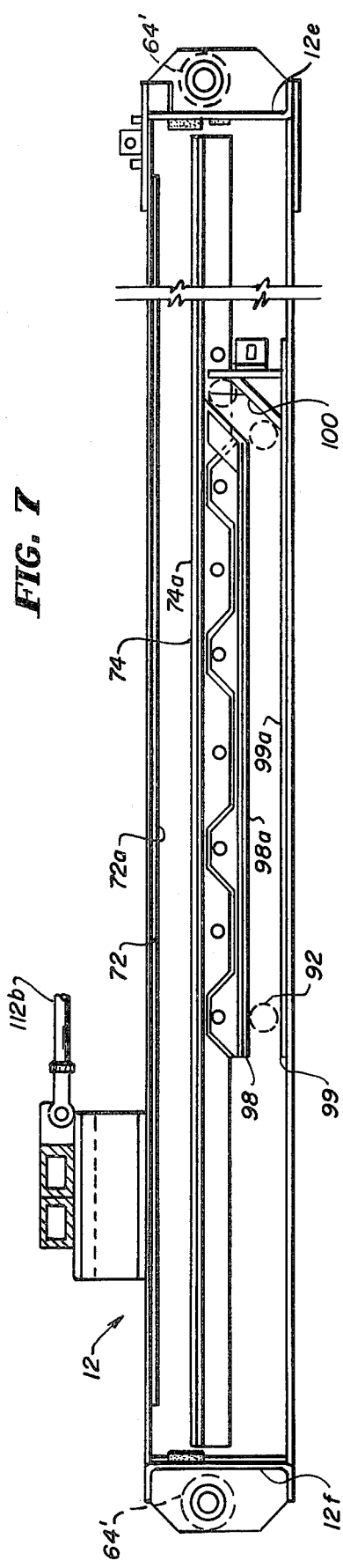
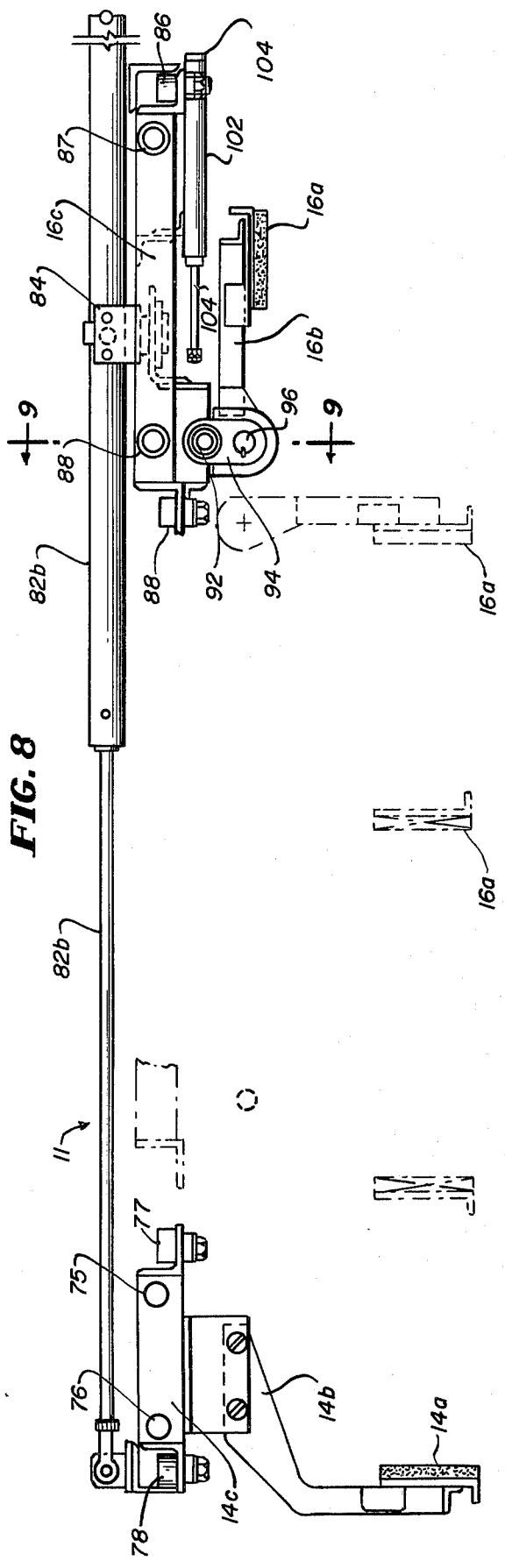
FIG. 7
FIG. 8

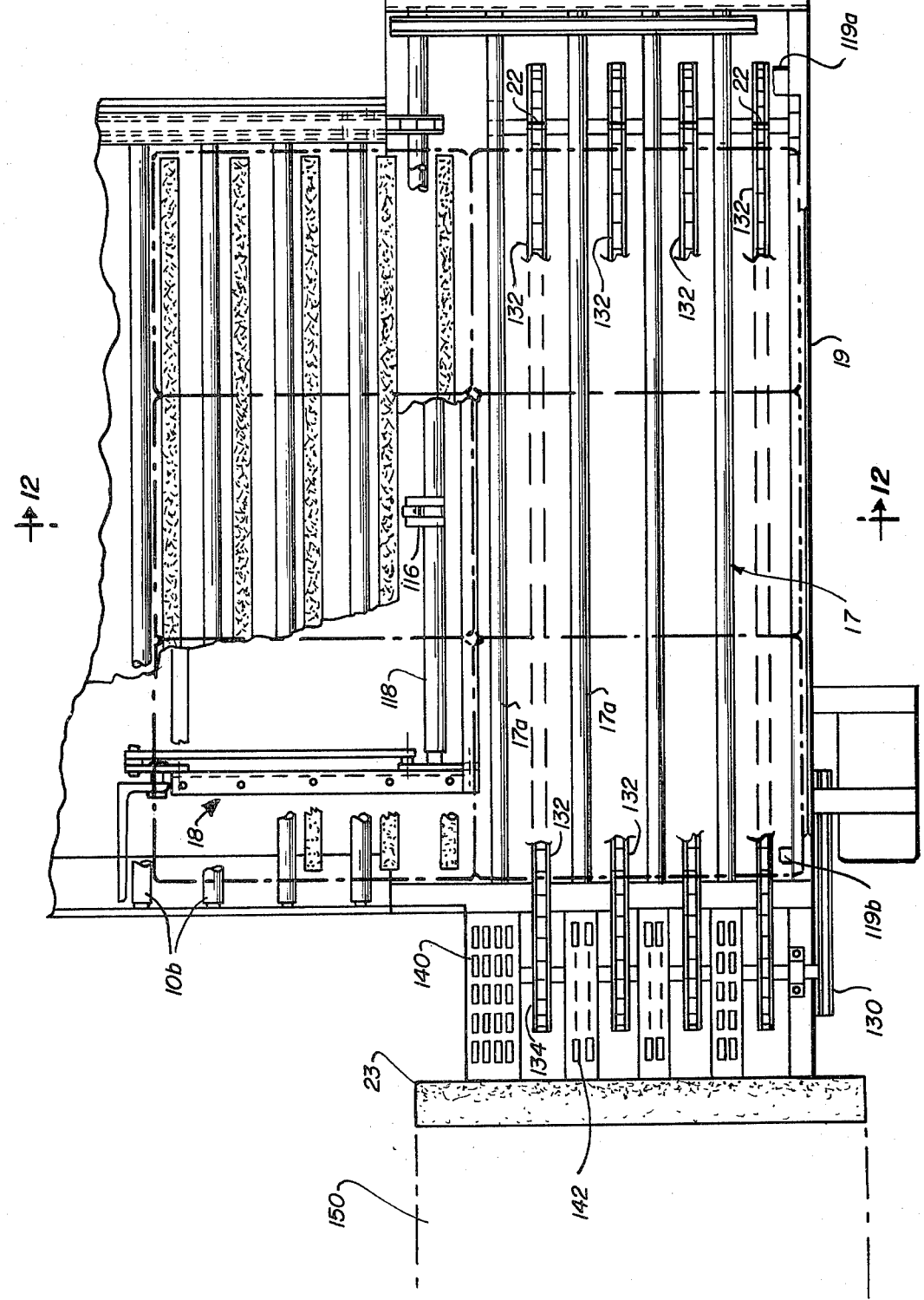

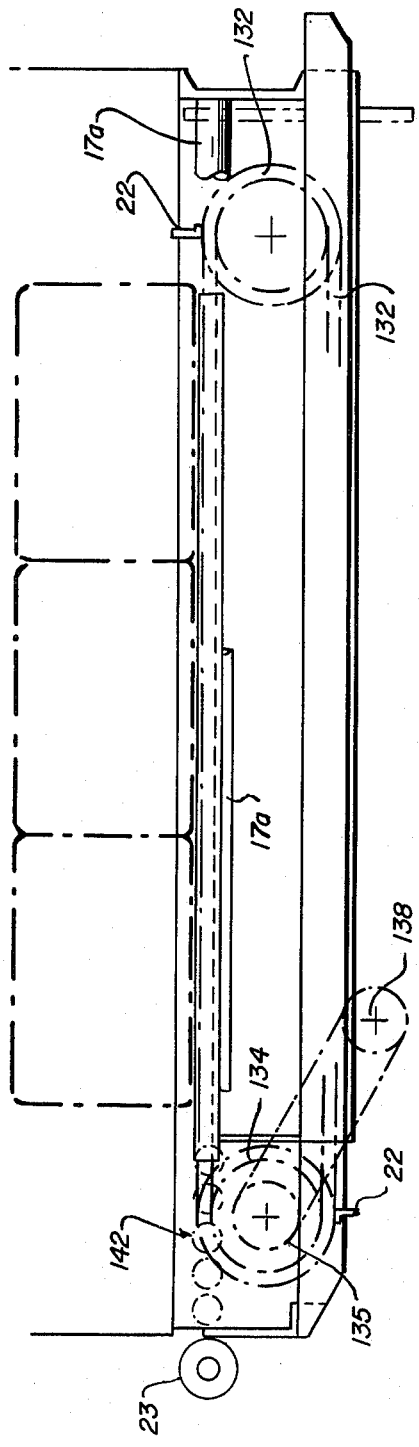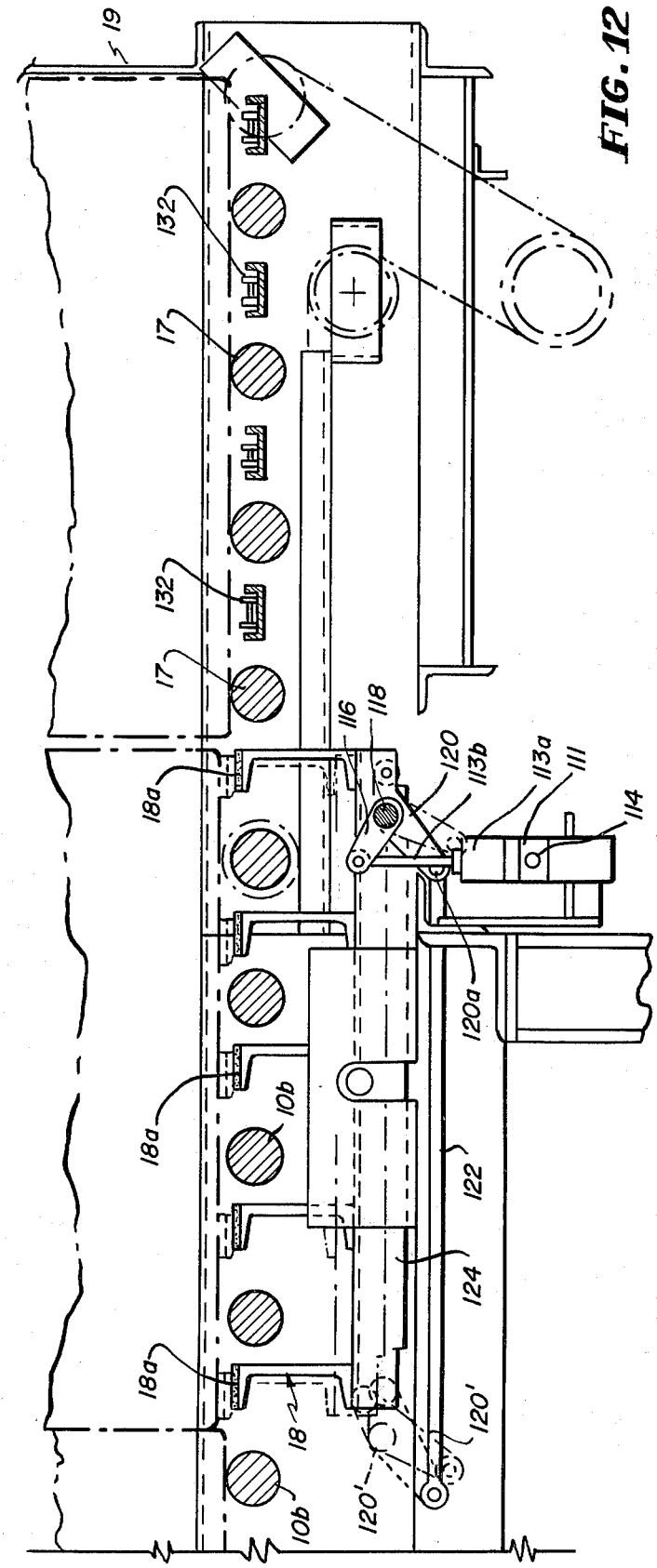

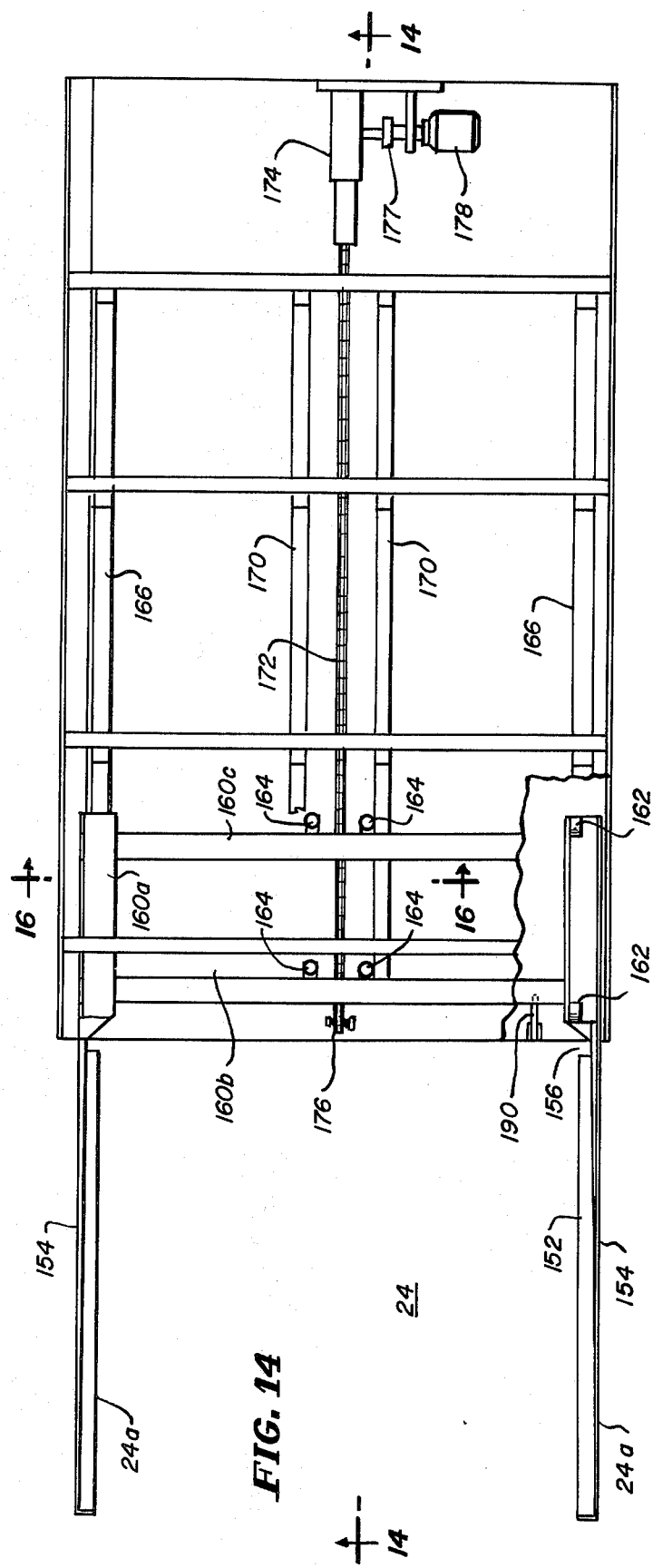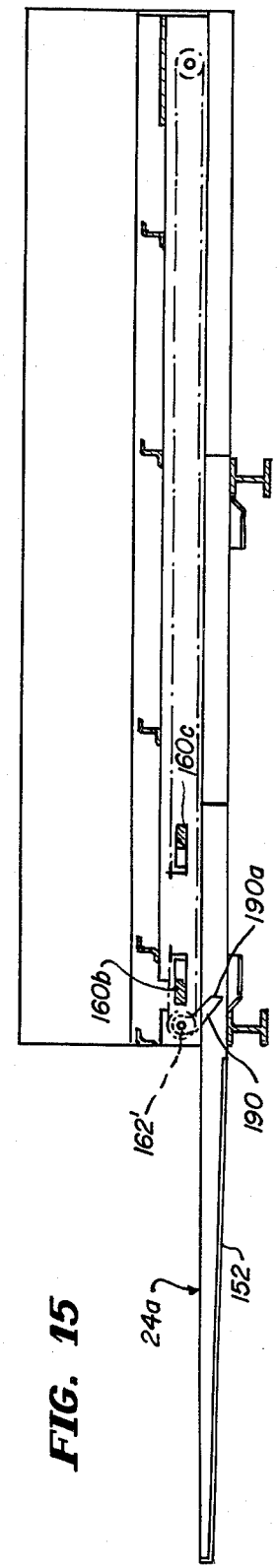

DEPALLETIZING AND PALLET STACKING APPARATUS

The present invention relates to article handling apparatus, and has its most important, but not its only, application to the palletizing of tiers of articles stacked upon a pallet and the stacking of the empty pallet when the tiers of articles have been removed therefrom.

While the art of depalletizing articles from a support pallet and the stacking of empty pallets has been highly developed in recent years, the equipment involved still leaves much to be desired from the standpoint of the reliability thereof, the floor space occupied by such equipment and the flexibility thereof in handling articles of varying size and/or arrangement. For example, U.S. Pat. No. 3,776,396 granted Dec. 4, 1973, discloses a very efficient depalletizing and pallet stacking system. However, this system leaves much to be desired from the standpoint of the space requirements thereof.

Also, a relatively efficient arrangement of depalletizing equipment is disclosed in U.S. Pat. No. 3,534,872 granted Oct. 20, 1970, but this equipment is devoid of any pallet stacking equipment and, furthermore, is not adapted to handle articles of widely varying size and/or arrangement, and is in some respects more complex than is ideally desirable for maximum reliability and minimum cost.

Many depalletizing systems, such as that disclosed in U.S. Pat. No. 3,534,872 include article clamping members which grip the uppermost tier of articles and deliver the same to the inlet end of a conveyor. However, the manner in which the article clamping members and the operating apparatus therefor was heretofore designed required for their proper operation a fixed predetermined number of articles in each row of articles of each tier of articles to be removed, and while the article clamping members disclosed in the latter patent provided for some variation in the size of each row of article involved, they could not handle a wide variation in the size, number or positioning of the articles.

It is, accordingly, one of the objects of the invention to provide unique article gripping apparatus which can be used to pick up articles of varying size, number and position successively delivered thereto without any intervening manual adjustments. A related object of the invention is to provide article gripping apparatus as just described which can simultaneously pick up one or a multiplicity of rows of articles where the size and/or number of articles in each row can vary between a given maximum number and zero, so the article gripping apparatus can handle random numbers, sizes and arrangements of articles delivered thereto.

A further object of the present invention is to provide a depalletizing and pallet stacking of unique overall arrangement so that both the depalletizing and pallet stacking operations can be performed by apparatus which occupies a minimum of floor space.

Pallets comes in two basic forms, one form of which is a flat plate-like structure without any legs for spacing the same from the floor, and the other of which includes spacer members or legs on opposite sides of the pallet between which are clearance spaces under which a forklift can be placed to lift the pallet and the articles supported thereby. The provision of legs or spacer members, however, increases the storage space necessary to store such pallets with their articles. Where flat pallets are used without the legs or spacer members referred to, difficulty is sometimes encountered in handling the pallets and in delivering the same to a discharge point.

In depalletizing systems heretofore developed, the loaded pallets generally were deposited by a forklift unit at a remote point from the depalletizing station where the articles are to be automatically removed from the pallet one tier at a time. A conveyor delivered the remotely deposited loaded pallets to the depalletizing station which required, in addition to the basic depalletizing station, additional conveyor equipment which took up floor space and added to the cost of the system involved.

It is, accordingly, an object of the present invention to provide a unique depalletizing system wherein flat pallets without legs or spacer members referred to can be conveniently received directly at the depalletizing station so that the need for intervening conveyors for delivering palletizer articles to a depalletizing station is eliminated.

The above and other objects of the invention will become apparent in making reference to the specification and the claims to follow.

SUMMARY OF THE INVENTION

In accordance with one of the features of the present invention, the depalletizing apparatus is provided with an inlet station having a loaded pallet frame fram elevatable in steps to bring each tier of articles supported preferably on a flat (i.e. legless) pallet in succession to the inlet end of a horizontally extending conveyor elevated above the bottom end of the inlet station. The need for intervening conveyors for delivering the loaded pallet to the inlet station is obviated by the unique design for the elevatable pallet support frame which most advantageously comprises U-shaped frame members providing spaced upstanding arms upon which a loader pallet can be deposited. The space between the upstanding arms provides a relatively large space permitting the lowering of a forklift unit to a point where the loaded pallet becomes fully supported by the U-shaped frame members.

In accordance with another feature of the present invention, each tier of articles which generally are packed in rectangular cartons arranged in contiguous rows is depalletized by unique article gripping and shuttle apparatus which operate effectively even when the size, number or position of the articles vary widely in each row of articles involved.

This unique article gripping and shuttle apparatus most advantageously comprises for each row of articles a pair of independently operable horizontally spaced clamping members which assume an initial relative position of maximum spacing, where they are located beyond the ends of the longest row of articles to be handled thereby. At the appropriate time, the clamping members are moved horizontally toward one another to the fullest exent possible, and the various pairs of clamping members are carried on a movable shuttle carriage which is initially positioned above the inlet station of the depalletizing apparatus. When the various parts of clamping members have grasped their associated row of articles, the shuttle carriage is moved vertically and horizontally to a point above the inlet station of the previously mentioned conveyor where the articles are released. It is preferred that each pair of clamping members be supported on the shuttle carriage in a manner where they are moved to a given reference position where corresponding articles of a consistent size in the various rows of articles are in lateral alignment, so that when they are released on the conveyor they are in lateral alignment for most convenient separation by well-known or other separation equipment, which removes one lateral row of articles at a time and deposits the same on a transversely extending out-feeding conveyor.

In accordance with another feature of the present invention, empty pallets are most advantageously stacked at a point below the elevation of, and preferably immediately below, the inlet end of the aforesaid elevated conveyor to which the shuttle carriage delivers each tier of articles. The pallet stacking is best achieved by stacking apparatus including a pallet stacking support frame having an outer end portion movable between a retracted position below the inlet end of the conveyor and an extended position above the loaded pallet inlet station where it can receive an empty pallet as the loaded pallet support frame moves downwardly after all of the articles have been removed therefrom. The loaded pallet support frame is so designed that it can move from a point above to a point below the extended outer end portion of the pallet stacking support frame without touching the same, so that an empty pallet is deposited upon the pallet stacking support frame as the loaded pallet support frame returns to its initial position to receive another loaded pallet.

The inner end portion of the pallet stacking support frame has an aperture therein through which a horizontally oriented pallet will freely drop onto a stack of empty pallets therebelow. A one-way pallet abutment means is provided which permits the passage of a pallet in one direction of movement thereof as the pallet stacking support frame moves to its retracted position beneath the inlet end of the aforementioned conveyor but forms an abutment for the end edge of the pallet as the pallet stacking support frame returns to its extended position. Thus, when the inner end portion of the pallet stacking support frame is moved beneath the held-in-place pallet, the pallet drops through the opening therein onto the stack of empty pallets therebelow.

Other features of the invention will become apparent on making reference to the specification and claims to follow.

DESCRIPTION OF THE DRAWINGS

FIG. 7 is a fragmentary longitudinal vertical sectional view through the shuttle carriage frame showing the clamp operating tracks of the shuttle carriage frame and the tracks on which the carriage frame for the article gripping units are movably mounted;

FIG. 8 is a longitudinal elevation view showing one of the article gripping units shown in FIG. 8;

FIG. 11 is a plan view of the longitudinal and transverse conveyors forming a part of the apparatus shown in FIG. 1;

FIG. 12 is a longitudinal vertical sectional view through the conveyor apparatus shown in FIG. 11, taken along section line 11—11 therein;

FIG. 13 is an end elevational view at the article separator portion of the apparatus shown in FIGS. 1—12;

FIG. 14 is a plan view of the pallet stacking portion of the apparatus shown in FIG. 1, taken along section line 14—14 therein;

FIG. 15 is a vertical longitudinal sectional view through the pallet stacking apparatus of FIG. 14, taken along section line 15—15 therein.

PREFERRED EMBODIMENT OF THE INVENTION

GENERAL DESCRIPTION

Figure 1:
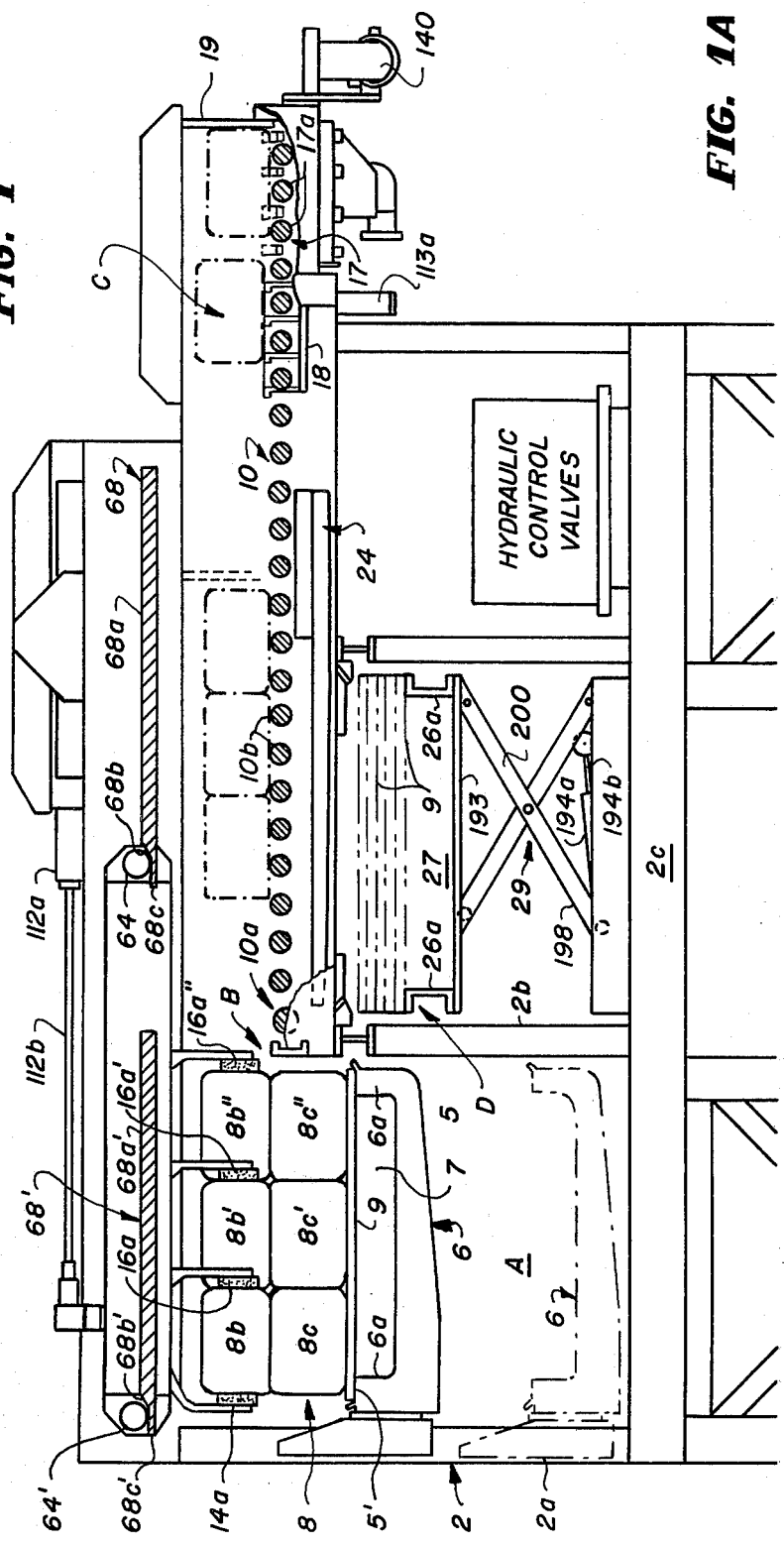
FIG. 1 is a front elevational view of the depalletizing and pallet stacking apparatus of the present invention.
Figure 2:
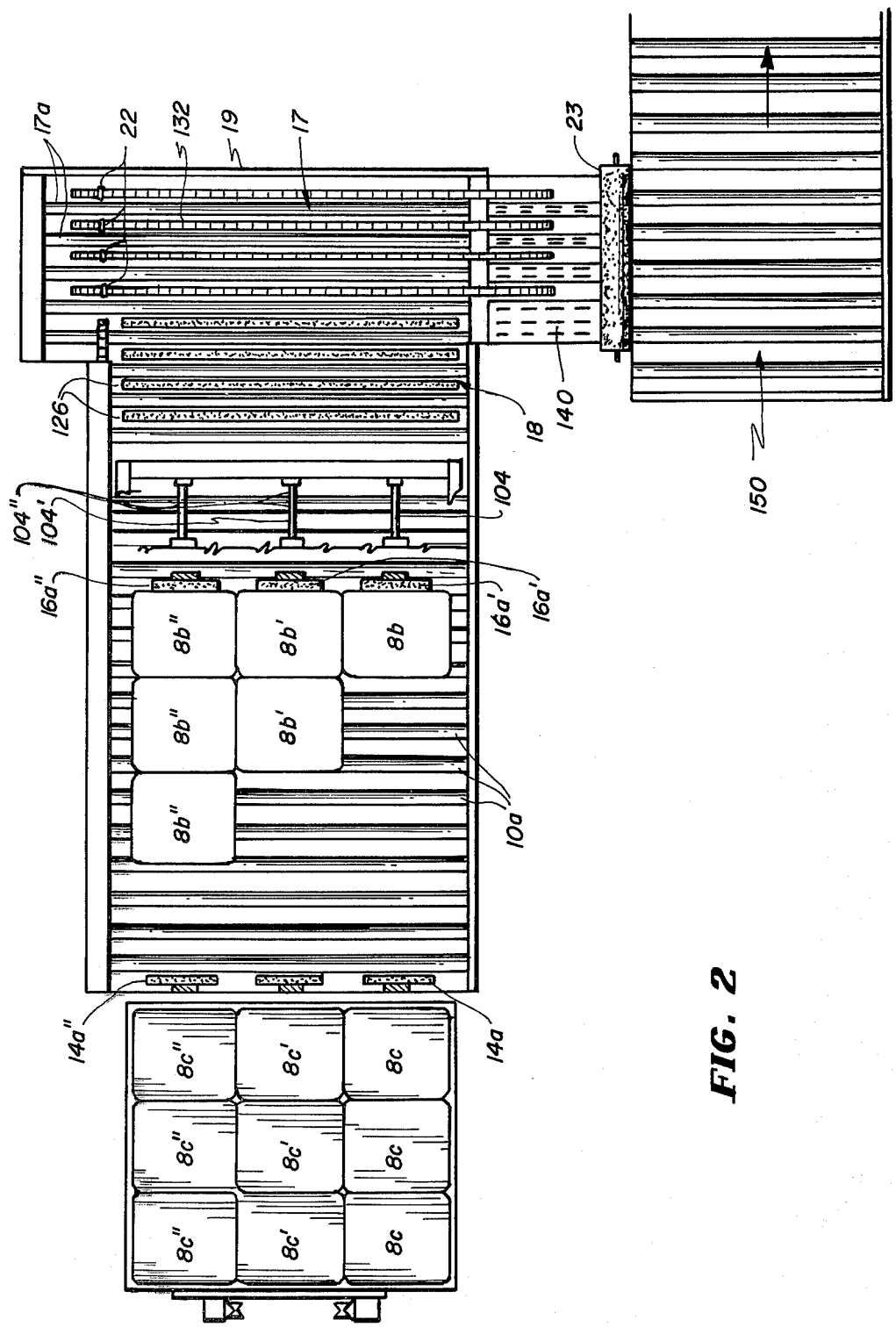
FIG. 2 is a horizontal sectional view of the apparatus shown in FIG. 1, taken along section plane 2—2 therein after the tier of cartons shown clamped at the depalletizing station in FIG. 1 has been discharged upon a conveyor.

Refer now more particularly to FIGS. 1 and 2 which illustrates one form of the invention wherein, in a single relatively compact unitary frame structure 2, there is provided a load pallet receiving inlet station A or A' at each lateral side of the structure, and a depalletizing station B above the inlet station where all of the rows of articles 8 in each tier of articles carried by the pallet 9 involved are removed as a group one tier at a time and then deposited upon the inlet end of an elevated horizontally extending conveyor 10 which delivers the articles first to a station C at the end of the conveyor which separates each lateral row of boxes involved and then separates the boxes of each lateral row, so that the articles are delivered one at a time to a discharge point. The frame structure 2 illustrated also includes an empty pallet stacking station D at which empty pallets are stacked. However, it is envisioned in a less preferred form of the invention that the pallets be delivered to some remote location for stacking.

The loaded pallet inlet stations are designed so that each loaded pallet can be directly delivered thereto by the horizontally extending arms (not shown) of a fork lift unit which may be carried by an overhead crane or by a fork lift truck where the inlet stations are near floor level. As illustrated, at the inlet stations, the unitary frame structure 2 is open at both lateral sides thereof so that loaded pallets can be delivered to either side of the frame structure. Thus, at each side of the frame structure 2 there is an opening 4 defined by longitudinally spaced vertical frame members 2a and 2b and a lower horizontal frame member 2c.

Figure 1A:
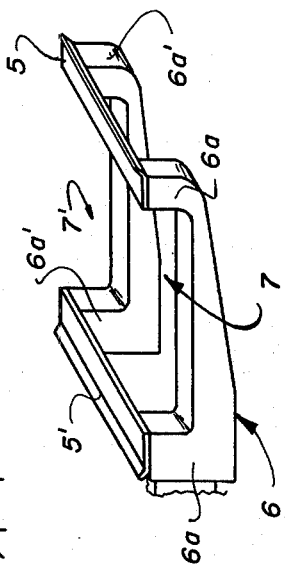
FIG. 1A is a perspective view of the loaded pallet support frame at the inlet station of the apparatus.

Mounted for vertical movement between inlet stations A—A' is a U-shaped loaded pallet support frame 6 illustrated in perspective view in FIG. 1A. The loaded pallet support frame 6 has two longitudinally spaced pairs of vertical pallet support arms 6a—6a and 6a—6a' defining therebetween spaces 7–7' into which the horizontally extending arms of the fork lift unit carrying a loaded pallet can be lowered, so that pallet 9 carrying as many as 4 tiers of articles (illustrated as being cardboard cartons) are deposited upon spaced laterally extending cross arms 5'–5' extending between the upper surfaces of the laterally spaced pairs of vertical pallet support arms 6a–6a' and 6a–6a'. The horizontally extending fork lift arms are removed from an inlet station by moving the same horizontally from between the pairs of vertical pallet support arms 6a or 6a' FIG. 1 shows in solid lines the loaded pallet support frame 6 in a partically elevated position with a tier of cartons in position to be delivered to the inlet end 10a of the elevated horizontally extending conveyor 10. The loaded pallet support frame 6 receives the fork lift arms when in a lowered position shown in dashed lines in FIG. 1. The manner in which the support frame 6 is mounted for vertical movement and operated to the various selected elevations will be described later on in the specification.

In FIGS. 1 and 2, the pallet 9 originally contained three tiers of cartons each arranged in three contiguous longitudinal rows. While normally each tier of cartons would comprise the full complement of cartons, to illustrate the flexibility of the invention, the original uppermost tier of cartons shown adjacent the carton separator station C has a single carton 8a in one longitudinal row, two cartons 8a'—8a' in an intermediate longitudinal row and three cartons 8a''—8a''—8a' in the third longitudinal row. In FIG. 1, the second or intermediate tier of cartons is still carried on the pallet 9 at the depalletizing station and comprises an arrangement of cartons 8b, 8b'—8b' and 8b''—8b''—8b'' identical to the arrangement of the previously described tier. The illustrated bottommost tier of cartons comprises a full complement of cartons 8c—8c—8c etc. which is three cartons in each of the three rows thereof.

In accordance with one of the features of the invention, depalletizing apparatus is provide which removes the loaded one tier of articles where each tier can have a widely varying number of articles, namely from zero to a maximum number in each longitudinal row of articles depending upon the size of the articles involved. For the sized cartons illustrated in the drawings, each longitudinal row of cartons can comprise a maximum of three cartons or a total of 9 cartons in each tier. The most preferred form of depalletizing means for removing each tier of cartons, as illustrated, includes a shuttle carriage 12 carrying three laterally spaced article gripping units 11, 11' and 11'' (FIGS. 3 and 4) each of which includes a pair of longitudinally spaced clamping members 14–16, 14'–16' or 14''–16''. In a manner to be described, the shuttle carriaage is moved between the position where it overlies the space in which the loaded pallet support frame 6 is vertically movable to a position above the inlet end of the conveyor 10. Each pair of clamping members is movable from a maximum spaced apart position where they are located beyond the ends of the longest row of articles to be carried thereby to a position of minimum spacing whereby the smallest sized article to be handled thereby can be clamped therebetween. In a manner to be described, each clamping member is adapted to be moved towards the corresponding associated clamping member until stopped by the engagement thereof with the end wall of the nearest article in the associated longitudinal row of articles involved. Then, after movement of the shuttle carriage 12 carrying the article gripping units to the conveyor 10, the clamping members are separated to drop the articles on the conveyor which is preferably a continuously operating conveyor. A specific aspect of the invention deals with the means for aligning the articles laterally on the conveyor 10 using the forwardmost clamping members 16a, 16a' and 16a'' for this purpose.

The conveyor 10 may take a variety of forms, but as illustrated, it comprises a plurality of outwardly extending continuously driven cylindrical rollers 10b which, at the outlet end thereof, delivers the cartons to separator station C adjacent an outfeeding conveyor which, as illustrated, includes a series of laterally extending idler rollers 17a terminating in an end wall 19. As soon as the forwardmost lateral row of cartons contact the end wall 19, a sensing means to be described is operated which operates carton lifting members 18 which moves rearwardly and upwardly to raise the next laterally aligned row of cartons slightly above the level of the rollers 10a and separate the same from the row of cartons in front of the same, so the front lateral row of cartons are free to be moved by carton pusher members 22 to be described.

The carton pusher members 22 push the lateral row of cartons longitudinally parallel to the axes of the idler rollers 17a upon a separator roller 23 which separates the individual cartons from one another.

After all of the tiers of boxes have been removed from the pallet 9, the loaded pallet support frame 6 will be in a maximum elevated position, and a horizontally movable pallet stacking frame 24 will be moved into an extended position between the vertical pallet support arms 6a—6a and 6a'—6a' of the loaded pallet support frame 6 below the upper surfaces thereof. The loaded pallet support frame 6 is then dropped to its lowermost position, and in the process of doing so discharges the pallet 9 upon the extended pallet stacking frame 24. The pallet stacking frame 24 is then retracted into a position beneath the conveyor 10 where the pallet is in position above the pallet stacking station D. When the pallet stacking frame is next moved into its extended position in a manner to be described, the pallet 9 supported thereon is dropped upon the stack of pallets therebelow at the pallet stacking station D. The various pallets are stacked upon an empty pallet support frame preferably including two longitudinally spaced channel members 26a—26a between which is defined a fork lift unit-receiving space 27. The pallet stack support frame is raised and lowered in any suitable way by suitable pallet raising and lowering means generally indicated by reference numeral 29.

Now that the general mode of operation of the various portions of the preferred depalletizing and pallet stacking apparatus of the present invention has been described, specific details of the preferred exemplary portions thereof will now be described.

DETAILS OF LOADED PALLET SUPPORT FRAME AND MEANS FOR RAISING AND LOWERING THE SAME

Figure 3:
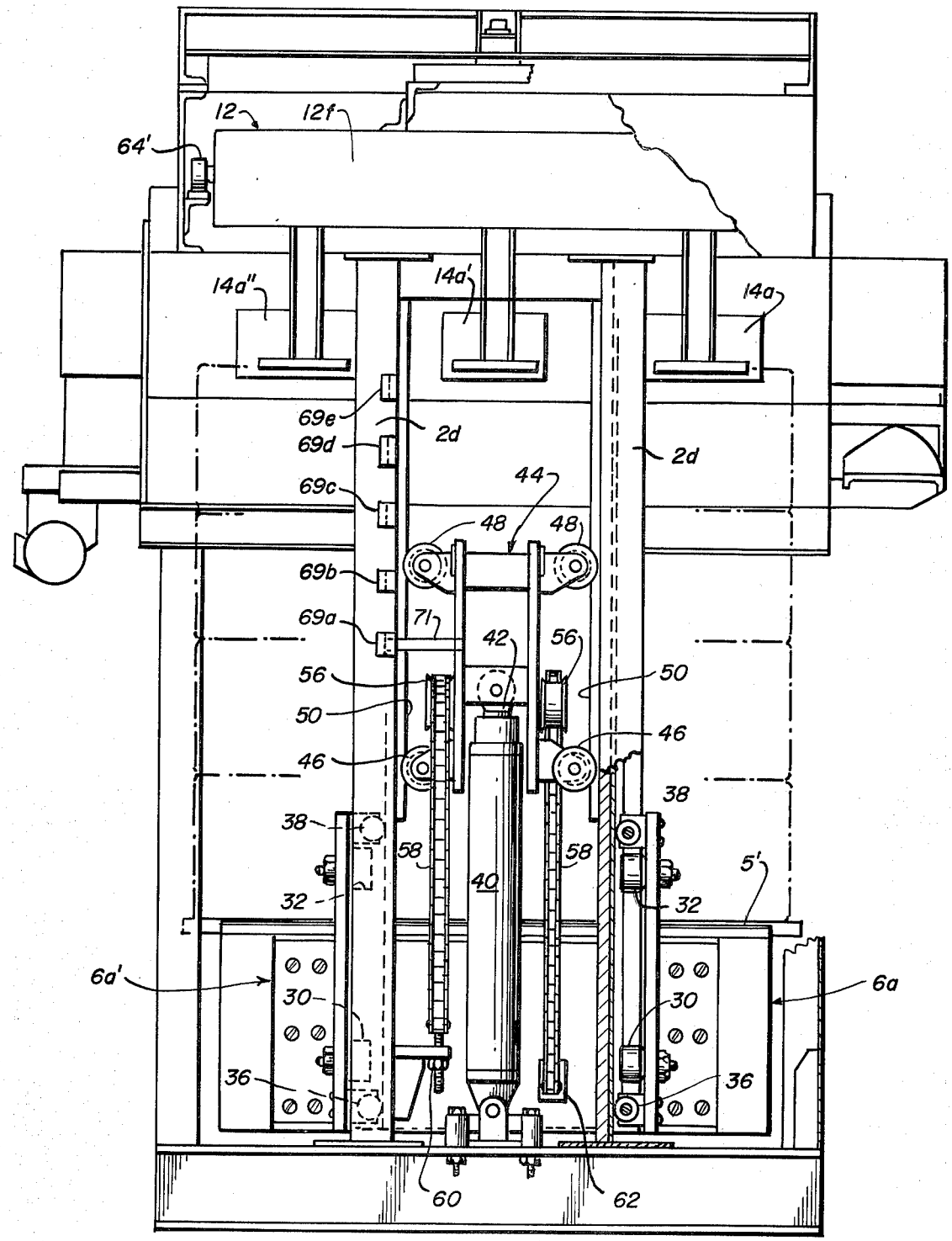
FIG. 3 is an end view, partly broken away showing the apparatus for raising and lowering the loaded pallet support frame.

Referring now more particularly to FIGS. 1A and 3, the loaded pallet support frame 6 has a pair of laterally spaced lower laterally spaced guide rollers 30—30 rotatable about lateral horizontal axes and an upper pair of laterally spaced guide rollers 32—32 also rotatable about lateral horizontal axes. The guide rollers 30—30 and 32—32 make rolling engagement with the forwardly facing vertical guide surfaces of a pair of vertical frame members 2d—2d of the main stationary frame structure 2. The loaded pallet support frame also carries a pair of lower laterally spaced rollers 36—36 mounted for rotation along longitudinal axes and an upper pair of similar laterally spaced rollers 38—38 also mounted for rotation about longitudinal horizontal axes. The lower and upper pairs of rollers 36—36 and 38—38 make rolling engagement with laterally outwardly facing vertical guide surfaces formed by the vertical frame members 2d—2d. The various rollers described and their associated guide surfaces thus support the loaded pallet support frame 6 for vertical up and down movement upon the frame structure 2.

The means for raising and lowering the loaded pallet support frame includes any suitable means, such as a hydraulic cylinder 40 having a piston rod 42. Hydraulic fluid is selectively feedable into one end or the other of the cylinder 40 to impart movement to the piston rod 42 upwardly or downwardly with respect to the cylinder 40. Connected to the piston rod 56 is a roller support frame 44 supporting a pair of laterally spaced bottom rollers 46—46 mounted for rotation about longitudinal horizontal axes and an upper pair of laterally spaced rollers 48—48 mounted for rotation about longitudinal horizontal axes. The rollers 46—46 and 48—48 have grooved peripheries which ride along the track-forming edges 50—50 of the vertical frame members 2d—2d. The roller carrying frame 44 also carries a pair of sheaves 56—56 adapted to slidably receive a pair of chains 58—58 one of the ends of which are anchored to brackets 60—60 projecting from the vertical frame members 2d—2d and the other ends of which are secured to portions 62—62 of the loaded pallet support frame 6. Thus, when the piston rod 42 is progressively moved upwardly relative to the cylinder 40, the ends of the chains 58—58 connected to the loaded pallet support frame will impart similar upward movement to the loaded pallet support frame guided in a manner previously described by the rollers 30—30, 32—32, 36—36 and 38—38.

The feeding of hydraulic fluid into the upper or lower end of the cylinder 40 may be controlled by a suitable solenoid operated control valve 61 (FIG. 46) of conventional construction which controls the flow of hydraulic fluid from a common inlet line 61a to an outlet line 61b extending at the bottom end of the cylinder 40 or to an outlet line 61c extending to the upper end of the cylinder 40. Whether the inlet line 61a is connected to the outline 61b or outlet line 61c depends upon whether a solenoid 63 or 63' is energized.

Figure 4A:
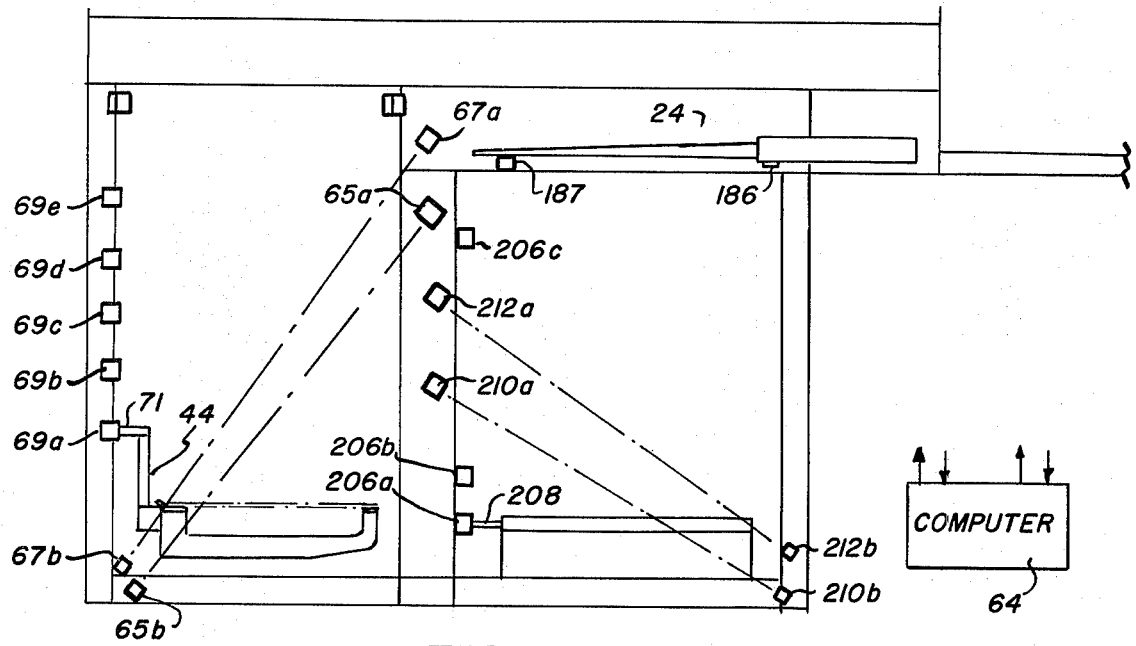
FIG. 4A shows in vertical elevation a diagrammatic view of the various sensing devices used throughout the depalletizing and pallet stacking apparatus of the present invention to control the various hydraulic devices illustrated therein.
Figure 4B:
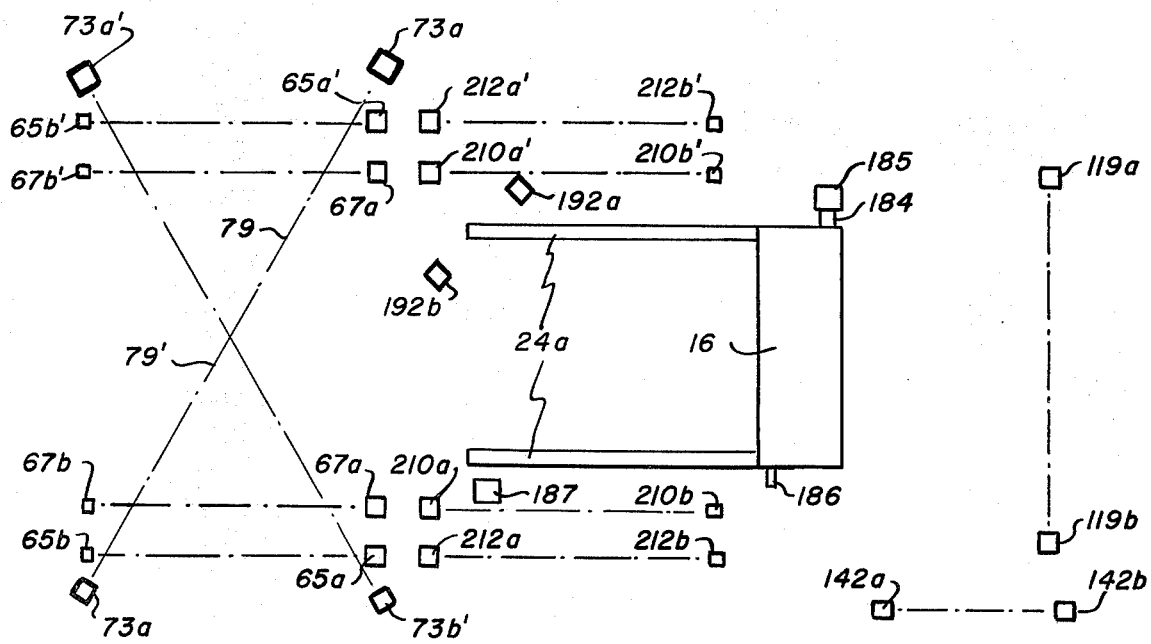
FIG. 4B is a plan view of the apparatus of the invention showing the positions of various sensing devices in FIG. 9A.

The energization of the solenoid 63 or 63' is under control of a number of sensing devices which may take a variety of forms. As shown in FIGS. 4A and 4B, there is provided at each inlet station A and A', a pair of light and photocell sensing means 65a—65b or 65a'—65b' which provide a light beam which is interrupted as long as a lift fork is within the space 7 or 7' respectively of the loaded pallet support frame and light and photocell means 67a—67b or 67a'—67b' which provide a light beam which is interrupted whenever a pallet 9 is supported on the loaded pallet support frame 6 when the support frame is in its lowermost position. When the signal output of the light and photocell means 67a—67b or 67a'—67b' indicates the interruption of the light beam by a pallet on the loaded pallet support frame and the output of the light and photocell means 65a—65b or 65a'—65b' indicates the re-establishment of the light beam as the lift forks are removed from the space 7 or 7', a computer 64 (FIG. 4A) generates a signal which effects the energization of solenoid 63 so hydraulic fluid flows through the output line 61c into the bottom portion of the cylinder 40 to initiate progressive upward movement of the piston rod 42 of the cylinder 40 to effect the upward movement of the loaded pallet support frame 6.

Various sensing devices 69a, 69b, 69c, 69d and 69e are provided at different elevations for sensing five different elevations of the loaded pallet support frame. The loaded pallet position sensing means 96a senses when the loaded pallet support frame is in its lowermost position. The loaded pallet sensing means 69a—69e may be mechanical sensing switches or light and photocell means adjacent which an actuating means 71 attached to a portion movable, for example, with roller support frame 44 pass as the loaded pallet support frame moves from its lowermost to its uppermost position.

When the actuating means 71 moves opposite each of the various sensing means 69a—69e, a signal is generated indicating the presence of the loaded pallet support frame at the designated elevation. Cooperating with the sensing means 69a—69e are two pairs of horizontally directed light and photocell means 73a—73b and 73a'—73b'. The light and photocell means 73a—73b and 73a'—73b' direct crossed beams 79–79' (see FIG. 4B) at the elevation of the upper portion of the shallowest article or carton in positioned to be carried to the inlet end of the conveyor 10 at the depalletizing station B. The cross beams 79 and 79' are so positioned that if there is one carton in any position of an upper tier of cartons ready to be depalletized, at least one of the light beams will be interrupted so a signal is generated to indicate the presence of a carton at the depalletizing station. The logic circuits of the computer 64 are arranged so that whenever the light and photocell means 73a—73b or 73a'—73b' indicate the interruption of the associated beam, and any of the sensing means 69b—69e senses the presence of the actuating means 71 associated with the loaded pallet support frame 6, the solenoid 63 of the solenoid operated valve 61 will be de-energized to cease the feeding of hydraulic fluid to the bottom of the cylinder 40. Whenever the actuating means 71 is opposite any of the sensing means 69b, 69c or 69d when the light and photocell means 73a—73b or 73a'—73b' indicate the absence of any carton at the depalletizing station, a signal is generated by the computer which re-energizes the solenoid 63 to initiate further feeding of hydraulic fluid to the bottom of the cylinder 40, so that the loaded pallet support frame will rise until the actuating means reaches the next highest sensing means.

When the actuating means 71 reaches the uppermost sensing means 69c, and both the photocell means 73b and 73b' indicate the absence of any carton at the depalletizing station, a signal will be generated by the computer to effect movement of the pallet stacking frame 24 in a manner to be described to its extended position and the energization of the solenoid 63' to effect feeding of hydraulic fluid through the outlet line 61b of the solenoid operated valve 61 to the upper end of the cylinder 40, to effect downward movement of the loaded pallet support frame. The computer effects the de-energization of the solenoid 63' as soon as the actuating means 71 reaches the lowermost sensing means 69a. At that point, the computer also effects the retraction of the pallet stacking frame 24 into a position below the inlet end of the conveyor 10 of the pallet involved, where the empty pallet involved will be carried into a position above the pallet stacking station D. (The details of the computer whose responding to the signals of the various sensing means just described is not herein disclosed, since it is well known in the art how to design logic circuits to respond to the presence or absence of signals to effect the various control operations described, and it is desired to avoid needlessly encumbering the present disclosure with such details).

DETAILS OF EXEMPLARY SHUTTLE CARRIAGE AND ARTICLE GRIPPING UNITS

As previously indicated, one of the unique features of the invention is the design of the shuttle carriage and article gripping units carried thereby which enable the apparatus to be useable with loaded pallets with cartons or other articles of various size and number.

Referring now most particularly to FIGS. 1 and 5–10, the shuttle carriage 12 is guided for horizontal movement between positions above the inlet station A and above the inlet end of the conveyor 10 by front and rear pairs of rollers 64—64 and 64'—64' mounted for rotation about lateral horizontal axes. The rollers 64—64 and 64'—64' make rolling contact with front and rear pairs of horizontal track-forming surfaces 68a—68a and 68a'—68a' (FIGS. 1 and 6) formed by track members 68—68 and 68'—68' secured to horizontally extending frame members 2e—2e of the frame structure 2. The shuttle carriage 12 also carries front and rear pairs of rollers 66—66 and 66'—66' mounted for rotation about vertical axis and positioned to make rolling engagement with track-forming surfaces 70a—70a and 70a'—70a' of track-forming members 70—70 and 70'—70' carried by the frame members 2e—2e. The rear ends of these track-forming surfaces 68a—68a and 68a'—68a' join rearwardly declining track sections 68b and 68b' ending in lower horizontal track sections 68c–68c' (FIG. 1). When the shuttle carriage 12 is opposite the depalletizing station B, the rear pair of rollers 64'—64' will be spaced rearwardly from the inclined track sections 68b–68b' so the shuttle carriage is in lowered position. When the shuttle carriage is moved to the inlet end of the conveyor 10, it is sometimes preferred that the front pair of rollers 64—64 engage the inclined track sections 68b—68b before the rear rollers 64'—64' engage the inclined track sections 68b'68b' so that the carriage is tilted forwardly and upwardly to effect a point line of contact between the clamped cartons which are being removed from the tier of cartons therebelow, to minimize friction between the cartons. Moreover the fact that the hydraulic cylinders 82b, 82b' and 82b'' are pivoted along lateral axes makes it also possible for the clamped cartons to slip by projecting edges of the cartons below as the clamped cartons are raised and translated by movement of the shuttle carriage from the depalletizing station, to avoid interlocking of the cartons. As the shuttle carriage is moved to the conveyor 10, the rollers 64—64 and 64'—64' ride up over the inclined track sections 68b and 68b' to the upper hozizontal track-forming surfaces 68a and 68a' to elevate completely the clamped cartons from the tier of cartons therebelow.

Figure 5:
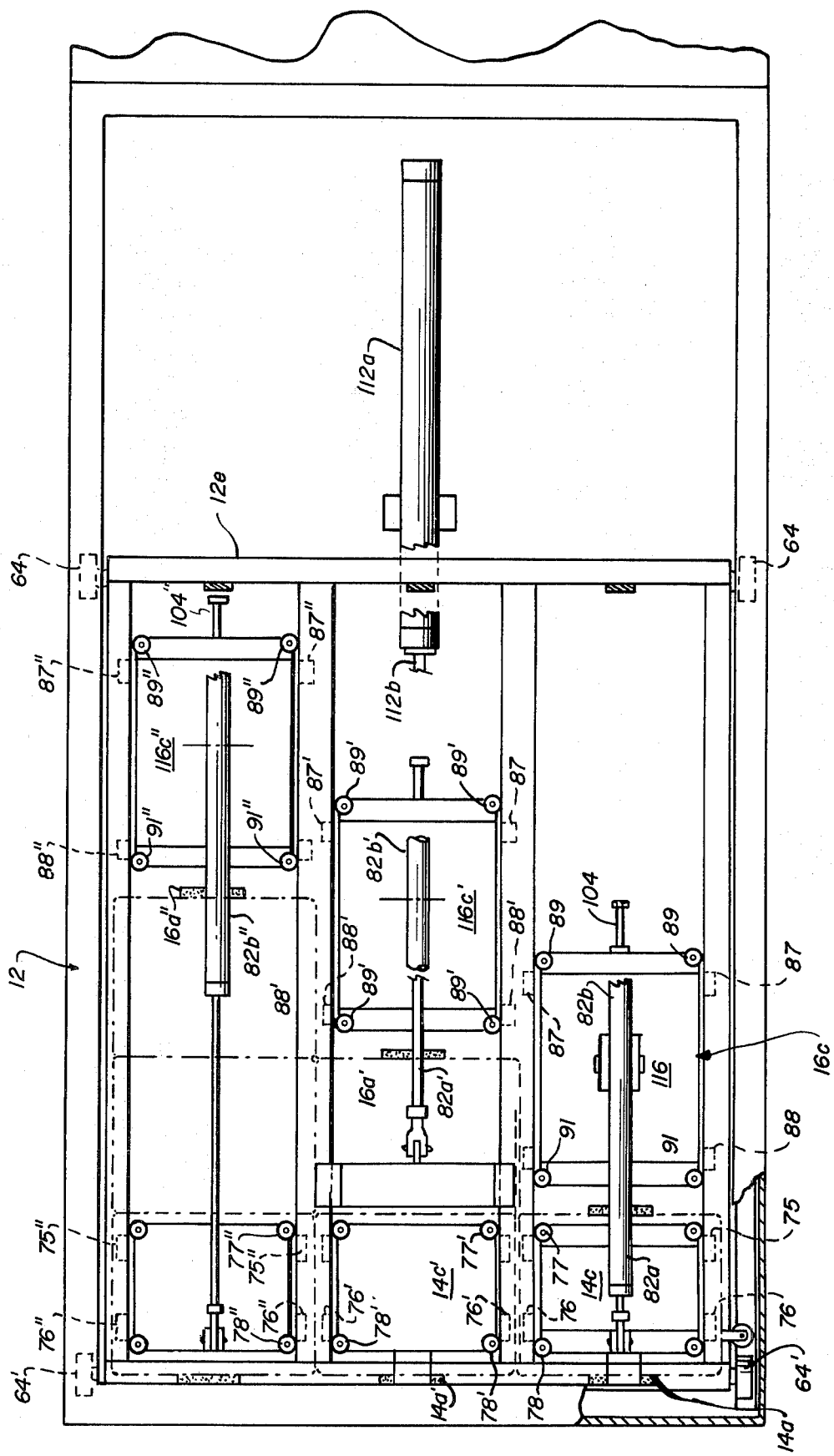
FIG. 5 is a plan view of the main shuttle carriage as it is being moved from the depalletizing station to the adjacent conveyor, the article gripping units thereof illustrated carrying different numbers of cartons.
Figure 6:
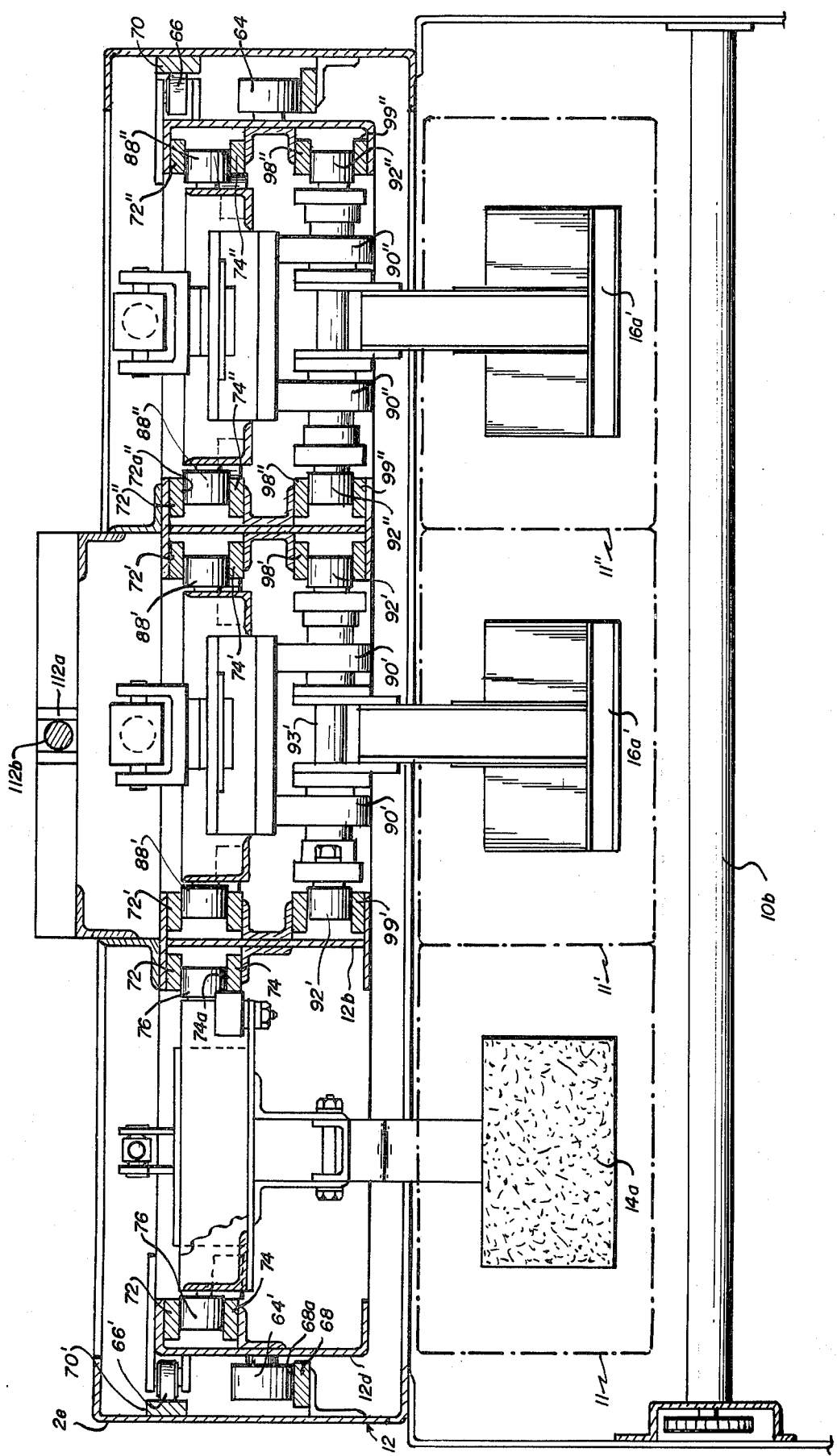
FIG. 6 is an enlarged vertical transverse sectional view through the main shuttle carriage of FIG. 5, taken through various section planes 6—6 thereof.

Supported for longitudinal movement within the main shuttle carriage are the aforementioned laterally spaced article gripping units 11, 11' and 11''. (Each of the article gripping units are identical and reference is sometimes made to FIG. 8 which shows the details of the article gripping unit 11, it being understood that the other article gripping units have identical constructions. Corresponding elements of the other article gripping units 11' and 11'' have been numbered similar to the article gripping unit 11 except that single prime (') and double prime ('') indications have been added to the reference numerals involved.) The clamping members 14a, 14a' and 14a'' each comprise a clamping pad presenting a vertical clamping surface. The clamping members 14a, 14a' and 14a'' form part of a fixed clamp assembly secured to arms 14b, 14b' and 14b'' anchored to roller carrying carriage frames 14c, 14c', and 14c'' (FIG. 5) carrying on opposite sides thereof front and rear pairs of vertical rollers 75—75 and 76—76, 75'—75' and 76'—76' and 75''—75'' and 76''—76'' mounted for rotation about horizontal lateral axes, and front and rear pairs of horizontal rollers 77—77 and 78—78, 77'—77' and 78'—78' and 77'λ '—77'' and 78''—78'' each mounted for rotation about a vertical axis. As best shown in FIGS. 5 and 6, the pairs of vertical rollers 75—75 and 76—76 on opposite sides of the roller carrying frame 14c make rolling contact with the horizontal confronting surfaces 72a–74a and 72a–74a of track-forming members 72—72 and 74—74 carried by longitudinal frame members 12a–12b (FIG. 6) of the shuttle carriage frame. Supported between shuttle carriage frame members 12b–12c are similar track-forming members 72'–74' and 72'–74' which form track surfaces 72a'-74a' and 72a'–74a' for the vertical pairs of rollers 75'—75' and 76'—76' (FIG. 5) of the article gripping unit 11'. Similarly, track-forming members 72''–74'' and 72''–74'' (FIG. 6) are supported by the shuttle carriage frame members 12c–12d to form guide track surfaces 72a''–74a'' and 72a''–74a'' for the pairs of vertical rollers 75''—75'' and 76''–76'' (FIG. 5) of the article gripping unit 11'''. The pairs of horizontal rollers 77—77 and 78—78, 77'—77' and 78'—78' and 77'λ '—77'' and 78''—78'' respectively ride along the side edges of the lower track-forming members 74—74, 74'—74' and 74''—74'' (FIG. 6).

Figure 4C:
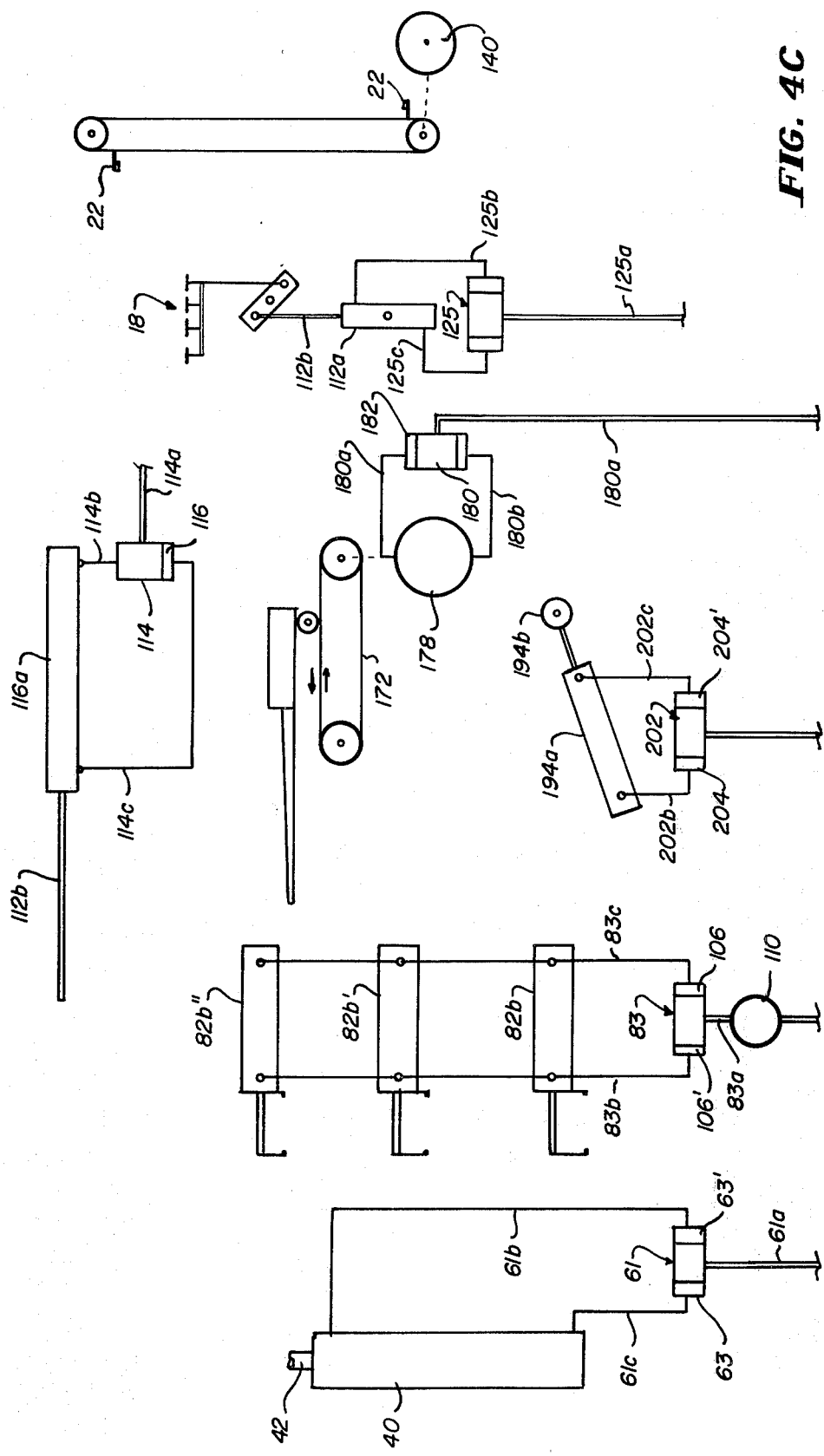
FIG. 4C is a diagram of the various hydraulic devices and solenoid operated control valves for operating the same which are controlled by the sensing devices of FIGS. 4A and 4B.

Each fixed clamp assembly is carried on the end of a generally horizontally extending piston rod 82a, 82a' or 82a'' extending from a generally horizontally extending hydraulic cylinder 82b, 82b' or 82b'' into one end or the other of which can be fed hydraulic fluid by a solenoid operated valve 82 (FIG. 4C). When the hydraulic cylinders receive hydraulic fluid in the right hand ends thereof as viewed in FIG. 5, the piston rods 82a, 82a' and 82a'' will move outwardly with respect to the hydraulic cylinders 82b, 82b' and 82b'' and when hydraulic fluid is fed into the left hand ends of the hydraulic cylinders the piston rods 82a, 82a' and 82a" will be retracted progressively within the hydraulic cylinders 82b, 82b' and 82b".

The hydraulic cylinders 82b, 82b' and 82b" are secured to brackets like 84 in FIG. 8 to which they can pivot to a limited degree along horizontal lateral axes (for example, permitting a limited pivoting movement of 2° with respect to the horizontal). The brackets extend from roller carrying frames 16c, 16c' and 16c" having front and rear pairs of vertical rollers 87—87 and 88—88, 87'—87' and 88'—88' and 87"—87" and 88"—88" mounted for rotation about horizontal lateral axes which ride in the aforementioned tracks defined between the track-forming surfaces 72a–74a, 72a'–74a' and 72a"–74a" in the associated sections of the shuttle carriage frame. Associated with the front pairs of vertical rollers 87—87, 87'—87' and 87"—87" are pairs of horizontal rollers 89—89, 89'—89' and 89"—89" mounted for rotation about vertical axes and which engage the edges of associated track-forming members 74—74, 74'—74' and 74"—74". Associated with the rear pairs of vertical rollers 88—88, 88'—88' and 88"—88" are pairs of horizontal rollers 91—91, 91'—91' and 91"— " mounted for rotation about vertical axes and which engage the edges of associated track-forming members 74—74, 74'—74' and 74"—74".

Depending from the roller carrying frames 16c, 16c' and 16c" are pairs of bearing-forming blocks like 90'—90' and 90"—90" (See FIGS. 6 and 10) in which shafts 93,93' and 93" (FIGS. 6, 9 and 10) are rotatably mounted. To each such shaft is a pivoted retractable clamp assembly including arm 16b, 16b' or 16b" on the ends of which are supported the aforementioned clamping member 16a, 16a' or 16a". Each retractable clamping assembly is movable into various angular positions between one where the clamping pad surface thereof is in a vertical plane where it is in a position to clamp against the end face of a carton and a fully retracted position where the clamping pad surface is in a generally horizontally extending position. The orientation of the retractable clamping assembly are controlled by pairs of rollers 92—92, 92'—92' and 92'λ'—92" carried on the ends of arms 94—94, 94'—94' and 94"—94" keyed to the shafts 93, 93' and 03". The rollers 92—92, 92'—92' and 92"—92" are mounted for rotation about lateral horizontal axes and are guided for movement in tracks formed between pairs of track-forming surfaces 98a–99a, 98a'-99a' and 98a'λ'-99a" of associated pairs of track-forming members 98-99, 98'-99' and 98"-99" secured to the pairs of vertical wall 12a-12b, 12b-12c and 12c-12d of the shuttle carriage frame. The tracks defined between the track-forming surfaces 98a–99a, 98a'-99a' and 98a'λ'-99a" extend horizontally for most of their length (see FIG. 7) and adjacent the front ends thereof join upwardly and forwardly inclined track sections like 100.

Figure 9:
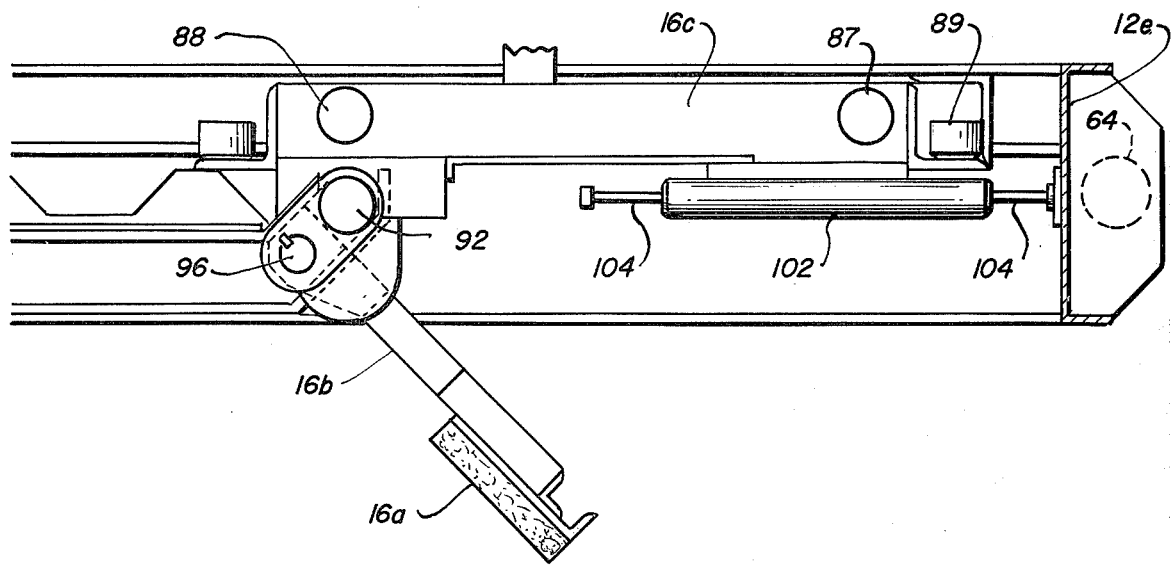
FIG. 9 is an enlarged view through the right-hand end portion of the article gripping unit shown in FIG. 8.
Figure 10:
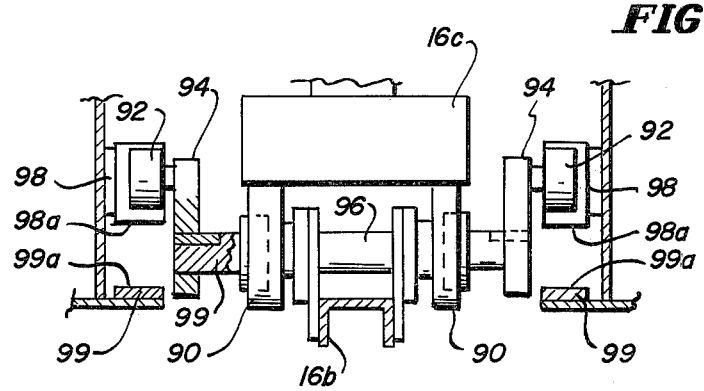
FIG. 10 is a sectional view through the article gripping unit of FIG. 9, taken along section line 9—9 thereof.
Figure 16:
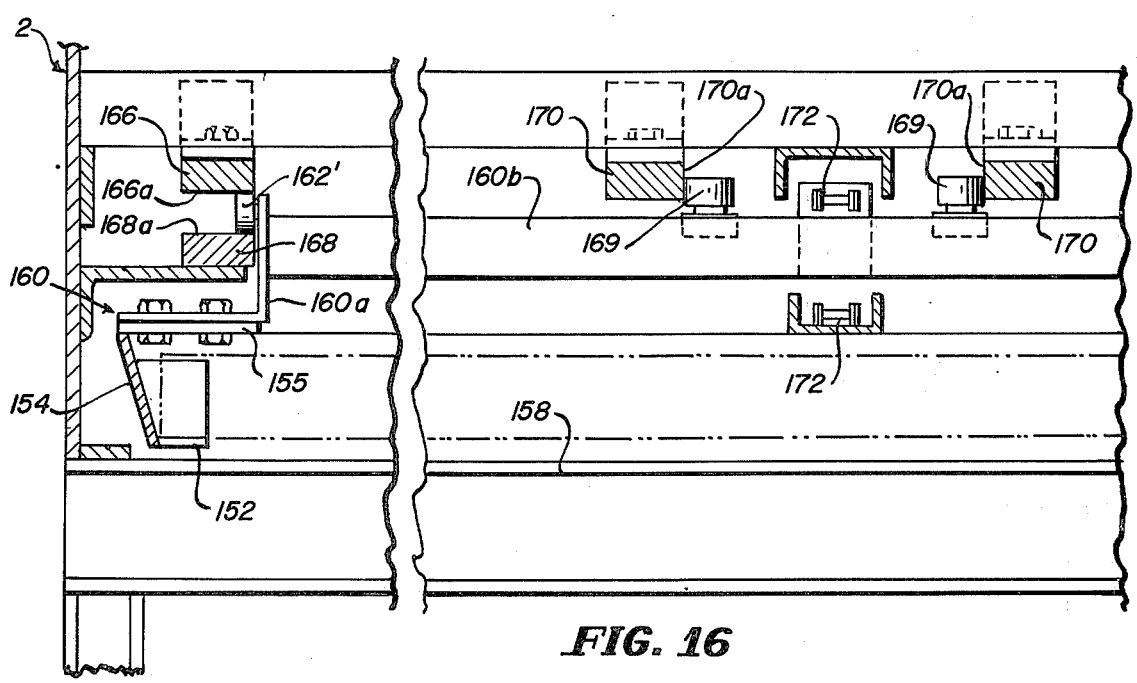
FIG. 16 is a fragmentary transverse sectional view of the apparatus of FIG. 15, taken along section line 16—16 therein.

When the rollers 92—92, 92'—92' or 92"—92" ride in the horizontally extending track sections, the clamp pad surfaces of the retractable clamping members will be in a vertical position. As the rollers 92—92, 92'—92' or 92"—92" ride into the inclined track sections the clamping members will be pivoted upwardly to a point where each roller first strikes a vertical track section like 100 (see FIG. 7) at which point the associated clamp assembly will be extending at an approximately 45° angle as shown in FIG. 9. The clamp assembly will reach its horizontal position shown in FIG. 8 in solid lines when the associated roller carrying frame 16c, 16c' or 16c" moves to the right of the position where the rollers first reach the vertical track section, causing the rollers to rise above this point, permitting the clamp assembly to pivot into a fully horizontal position.

The roller carrying frames 16c, 16c' and 16c" of the article grasping units 11, 11' and 11" carry horizontally extending spring loaded pusher assemblies 102, 102' and 102" from which longitudinally horizontally extend pusher rods 104, 104' and 104" which are normally spring urged into an outermost position shown in FIGS. 2, 5 and 8. In the initial position of each of the article grasping units 11, 11' and 11" (FIG. 8), where the shuttle carriage 12 carrying the same is above the inlet station A ready to receive a signal to effect a depalletizing operation, the fixed clamp operating piston rods 82a, 82a' and 82a" are fully extended from the associated cylinders 82b, 82b' or 82b", and the force of the hydraulic fluid filling the right hand ends of the associated hydraulic cylinders cause the arms 14b, 14b' and 14b" of the associated fixed clamp assemblies to be urged against the rear shuttle carriage frame member 12f, which causes a reaction force on the roller carrying frames 16c, 16c' and 16c" which depress the spring loaded pusher rods 104, 104' and 104" against the forwardmost shuttle carriage frame member 12e. The corresponding ends of the hydraulic cylinders 82b, 82b' and 82b" are respectively interconnected through various hydraulic fluid connecting lines which end in hydraulic lines 83b and 83c (FIG. 4C) extending to the solenoid operated valve 83. The solenoid operated valve 83 has a common hydraulic fluid input line 83a. The solenoid operated valve 83 has a solenoid 106 associated therewith which when energized interconnects the input line 83a to the output line 83c extending in series to the right hand ends of the various hydraulic cylinders, and a solenoid 106' which when energized interconnects the common input line 83a to the output line 83b connected in series with the left hand ends of the various hydraulic cylinders 82b, 82b' and 82b". When neither of the solenoids 106 or 106' is energized, input line 83a is disconnected from both output lines 83b and 83c. The spring pressure urging the pusher rods 104, 104' and 104" of the various spring loaded pusher assemblies 102, 102' and 102" is such that the pusher members will not be depressed until there is opposition to the further filling of all of the hydraulic cylinders involved. Accordingly, the spring loaded pusher rods 104, 104' and 104" will not be depressed until the stationary clamp assemblies associated with all the hydraulic cylinders are forced against the rearwardmost shuttle carriage frame member 12f and all of the spring loaded pusher rods are in engagement with the forward shuttle carriage frame member 12e, at which point the retractable clamp assembly operating rollers 92—92, 92'—92' or 92"—92" have just reached the bottom of the associated inclined track section 100. The retractable clamping members 16a, 16a' and 16a" are then still in their vertical positions. The further feeding of hydraulic fluid into the right hand ends of the various hydraulic cylinders will then effect compression of the spring loaded pusher members simultaneously, to pivot the retractable clamping members into their horizontal positions. This mode of operation of the apparatus is effective in laterally aligning the cartons in a manner to be described.

When the shuttle carriage 12 is in position above the depalletizing stations B, and it is desired to depalletize the tiers of cartons thereat, solenoid 106' is energized to feed hydraulic fluid into the left hand ends of all of the hydraulic cylinders 82b, 82b' 82b'' to cause the piston rods 82a, 82a' 82a'' to be retracted within the associated hydraulic cylinders, to urge the fixed and retractable clamping members toward one another, to clamp the associated cartons therebetween. When this occurs, the energy built up between the compressed spring loaded pusher members 104, 104' and 104'' is released, and the spring pressure involved imparts movement to the various hydraulic cylinders to the left to speed up the process of the extension of the retractable clamping members into a vertical position as the rollers 92—92, 92'—92' and 92''—92'' are rapidly pushed into the horizontal section of the tracks 98a-99a, 98a'-99a' and 98a''-99a'' and against the nearest end faces of the nearest cartons in the rows of cartons involved otherwise, the inertia of the heavier hydraulic cylinders and the associated parts to which they are connected would cause a slower movement of the retractable clamping members into clamping engagement with the cartons involved.

The signal which initiates movement of the shuttle carriage 12 from its position above the depalletizing station A to a position above the inlet end of the conveyor 10 is most advantageously generated by a pressure switch 110 located in the common hydraulic inlet line 83a of the solenoid operated valve 83. Thus, when the associated pairs of fixed and retractable clamping members reach a given degree of clamping forces against the cartons, the resultant pressure increase in the common inlet hydraulic line 83a will cause the switch 110 to open or close to generate a signal indicating that the shuttle carriage can then be moved to a position above the inlet conveyor.

The means for moving the shuttle carriage 12 between its extreme position is illustrated as a hydraulic cylinder 112a (see FIG. 1) from which extends a piston rod 112b connected to the shuttle carriage frame. The movement of hydraulic fluid into the right or left ends of the hydraulic cylinder 112a is controlled by a solenoid operated valve 114 (FIG. 4C) which has a common hydraulic fluid input line 114a, a right output line 114b extending to the right end of the hydraulic cylinder 112a and a left output line 114c extending to the left end of the hydraulic cylinder 112a as viewed in the drawings. When a solenoid 116 is de-energized, the common input line 114a is connected to the right output line 114b, and when the solenoid 116 is energized the common input line 114a is coupled to the left output line 114c. When the aforementioned pressure switch 110 located in the common hydraulic input line 83a of the solenoid operated valve 83 is operated as previously explained, this will effect energization of the solenoid 116 to couple hydraulic fluid to the left end of the hydraulic cylinder 112a to cause the piston rod 112b to retract within the hydraulic cylinder 112a. When the piston rod 112b is fully retracted within the cylinder 112a, a sensing switch 120 (see FIG. 4A) is operated to energize the solenoid 106' which effects feeding of hydraulic fluid to the left ends of all of the hydraulic cylinders 82b, 82b' and 82b'', to effect separation of the pairs of clamping members 14a-16a, 14a'-16a' and 14a''-16a'' to release the articles previously clamped thereby. As these articles are dropped upon the conveyor 10, which is a continously operating conveyor as previously described, the cartons in the example being described will be impelled in the direction of the generally still vertically oriented retractable clamping members 16a, 16a' and 16a'' which, as previously explained, will not be pivoted into a horizontal position until all of the fixed clamping member arms 14b, 14b' and 14b'' will have been pushed against the rear of the shuttle carriage frame member 12f and the spring loaded pusher members 104, 104' and 104'' will have engaged the forward shuttle carriage frame member 12e. In the meantime, the continuously operating conveyor 10 will have impelled the forwardmost cartons in the various rows of cartons against the still vertically oriented retractable clamping member 16a, 16a' and 16a'' as shown in FIG. 2, thereby to effect a lateral alignment of the cartons which is necessary for the proper operation of the article separating apparatus to be described. Thus, even though the cartons are randomly positioned on the pallet 9 (provided they are arranged in longitudinal rows), and despite the variable numbers of cartons in each particular row, the equipment automatically depalletizes and laterally aligns the cartons for proper further separation in the manner to be described.

The signal which initiates by de-energization of solenoid 116 the return of the shuttle carriage from its position above the inlet conveyor 10 to a position above the depalletizing station B may be generated in any suitable way. For example, the increase in pressure sensed by the pressure switch 110 in the common input line 83a at a time when the sensing switch 120 is operated to indicate the position of the shuttle carriage above the inlet end of the conveyor 10 will create a signal condition which enables the computer referred to to generate a signal which will de-energize the solenoid 116 to effect feeding of hydraulic fluid to the right hand end of the shuttle carriage operating hydraulic cylinder 112a.

DETAILS OF MEANS FOR SEPARATING CARTONS AT THE ARTICLE SEPARATOR STATION C

When the first laterally aligned row of cartons strikes the aforementioned end wall 19 just beyond the end of the idler rollers 17a (see FIG. 11), a suitable sensing means such as light and photocell means 120a-120b is actuated to effect energization of a hydraulic cylinder 112a (see FIG. 12) which causes a piston rod 113b to be retracted downwardly into the cylinder 113a as viewed in FIG. 12. The piston rod 113b is secured to a link 116 which is keyed to a shaft 118 rotatable supported in a stationary portion of the frame structure. Also keyed to the shaft 118 is a lever arm 120 having an end portion 120a on one side of the shaft 118 and secured to one end of a link rod 122 and an end portion 120b on the opposite side of the shaft 118. The other end of the link rod 122 is secured to an end portion 120a' of an arm 120 which is rotatably mounted about a stationary pivot axis 118'. The arm 120 has an opposite end portion 120b' on the opposite side of the pivot axis 118'. Accordingly, when the piston rod 113b is retracted downwardly, this effects a counterclockwise rotation of the shaft 118 which lowers the pivot link 122 which imparts a similar downward movement to the end portion 120a' of the lever arm 120'. The lowering of the end portions 120a and 120a' of the levers 120 and 120' both raise and move to the left the opposite end portions 120b and 120b' thereof secured to a frame 124 carrying the aforesaid carton lifting members 18. If the shaft 118 is fixed to a stationary pivot axis, it is necessary that the hydraulic cylinder 113a and the piston rod 113b extending therefrom be pivotable to a limited degree about a lateral horizontal axis. To this end, the cylinder 113a is secured to a bracket 111 which has a limited degree of pivotal movement along a pivot axis 114.

The carton lifting members 18 are shown as being channel shaped members positioned between contiguous pairs of conveyor rollers 10b—10b at the end of the conveyor 10. The channel shaped carton lifting members 18 are oriented so that their webs are in vertically spaced relationship, the uppermost webs carrying pads 18a which engage the bottom surfaces of the cartons on the rollers 18b and raise and move the same to the left as the frame 124 is similarly raised and moved to the left. In this uppermost position of the frame 124, the pads 18a are at an elevation slightly above the rollers 10b so the driving force of the rollers is removed from the cartons supported thereon. Since the cartons on the pads 18a have been moved also slightly to the left, these cartons are separated from the row of cartons in front of the same which are on the idler rollers 17a adjacent the end wall 19 and in the process of being pushed along the end wall by the aforesaid pusher members 22. Thus, the cartons which rest against the end wall 19 are free to move transversely of the laterally aligned row of cartons immediately behind the same because of their separation therefrom.

If the piston rod 113b is normally in its uppermost position it is moved to its retracted position by the feeding of hydraulic fluid into the upper portion of the cylinder 113a under control of a solenoid operated valve 125 (see FIG. 4c) having a hydraulic input line 125a and a hydraulic output line 125b extending to the upper end of the cylinder 112. When a solenoid 127 is energized, the input line 125a is connected to the output line 125b to effect retraction of the piston rod 113b into the cylinder 113a. The solenoid operated valve 125 also has an output line 125c extending to the bottom end of the hydraulic cylinder 113. When the solenoid 127 is de-energized, the input line 125a is coupled to the output line 125c. Solenoid 127 remains energized as long as the light and photocell sensing means 119a-119b remains actuated by a carton positioned on the idler rollers 17a.

The cartons are moved off of the idler rollers 17a by the aforesaid pusher members 22 extending outwardly from associated laterally spaced link chains 132 carrying the same. The link chains (FIGS. 11 and 13) extend around end sprockets 132-134. The sprockets 132 are idler sprockets and the sprockets 134 are drive sprockets secured to a common shaft carrying a sprocket 135 coupled by a chain 136 to a sprocket 138 secured to the shaft of a drive motor 140. The chains 132 have a pair of pusher members 22—22 spaced one-half the length of the chain. The upper sections of the chains 132 are positioned to move between the idler rollers 17a and the pusher members 22 carried thereby extend upwardly therefrom where they can engage the end faces of the last carton in each laterally aligned row of cartons moved against the end wall 19. The drive sprockets 134 are rotated in a direction which will carry the pusher members 22 on the upper section of the chains 132 toward an outlet station 140 where there are located suitable skate rollers or the like 142 positioned between the sprockets 134. These skate rollers 142 carry the cartons pushed thereon to the separator roller 23 operating at a greater peripheral speed than the lineal speed of movement of the pusher member 22 so that the various cartons in the lateral row of cartons involved will be separated from one another and delivered to an out feeding conveyor generally indicated by reference numeral 150.

When one of the pusher members 22 on each chain 132 has been moved around to the bottom section of the chain slightly spaced from the associated drive sprocket 134, the beam of a light and photocell means 142a-142b (FIG. 4B and 4C) is interrupted and the other pusher member 22 on the same chain will be in a position to engage the end of the last carton in the next lateral row of cartons moved against the end wall 19. When the light beam associated with the light and photocell means 119a-119b along the end wall 19 is interrupted by the movement of a carton against end wall 19, as previously indicated, lifter solenoid 127 is energized and the drive motor 140 is energized by control computer 64 to impart movement to the pusher members 22. When the latter light beam is re-established by the movement of the last carton from the idler rollers 17a, this will effect the de-energization of the aforementioned solenoid 127 which will effect the lowering of the lifter members 18 so that the previously raised laterally aligned row of cartons will drop upon the driven rollers 10b which will then move the same against the end wall 19 to initiate a new article separation cycle like that just described. Soon thereafter, when the light beam associated with the light and photocell means 142a-142b is interrupted by the pusher members 22, the motor 140 is de-energized.

DETAILS OF EXEMPLARY PALLET STACKING APPARATUS

As previously indicated in the general description, after all of the cartons have been removed from a pallet 9 at the depalletizing station as indicated by the rising of the actuating means 71 of the loaded pallet support frame 6 to the uppermost sensing means and the establishment of light beams 79 and 79', the pallet stacking frame 24 is moved into its extended position below the depalletizing station B, so that the subsequent immediate lowering of the loaded pallet support frame 6 will drop an empty pallet thereupon. The pallet stacking frame 24 as illustrated in FIGS. 13-15 comprises a pair of laterally spaced confronting pallet support arms 24a—24a formed by metal members having vertical wall portions 154—154 from the bottom of which inwardly horizontally extend pallet support ledges 152—152 which support the empty pallet dropped thereupon as the loaded pallet support frame 6 moves therebeneath. The confronting pallet support arms 24a—24a are located out of the path of movement of the loaded pallet support frame 6 so the frame can pass by the same when the arms 24a—24a are in their extended positions. Ledges 152—152 terminate at their inner ends at points 156—156 in front of which is defined an opening 158 (see FIG. 15) through which an empty pallet can drop when the pallet overlies this portion of the confronting arms 24a—24a.

The confronting arms 24a—24a are carried upon a carriage frame generally indicated by reference numeral 160. As illustrated, the carriage frame 160 includes a pair of longitudinally extending laterally spaced angle members 160a—160a to which are secured inturned portions 155—155 extending from the upper extremities of the inner end portions of the vertical walls 154—154 of the pallet support arms 24a—24a, and members 160a—160a are interconnected by transverse frame members 160b—160b. The carriage frame 160 carries front and rear pairs of vertical rollers like 162 and 162' which are mounted for rotation about lateral horizontal axes. Carriage frame 160 also includes in the center portion thereof a pair of horizontal rollers 164—164 mounted for rotation about vertical axes. The rollers 162 and 162', ride between track-forming surfaces 166a and 168a formed by track members 166 and 168 secured to the stationary framework 2. The horizontal rollers 164—164 ride along the vertical surfaces 170a—170a of track-forming members 170—170 secured to the stationary framework 2. The rollers 162, 162' and 164 and the associated tracks thus guide the carriage frame 160 and the pallet support arms 24a—24a secured thereto for longitudinal movement between two extreme positions where the arms 24a—24a are respectively extended below the depalletizing station and retracted therefrom.

The means for moving the carriage frame 160 between its limits of movement as illustrated includes a chain 172 extending around sprockets 174 and 176. The sprocket 174 is a drive sprocket secured through a coupling 177 to a hydraulic motor 178. As best shown in FIG. 4C, the hydraulic motor 178 is rotated in one direction or the other depending upon whether hydraulic fluid is fed therein through an output line 180b or 180c of a solenoid operated valve 180 having a common hydraulic fluid input line 180a. When a solenoid 182 is energized, the common input line 180a is coupled to the output line 180c to rotate the shaft of the motor 178 in one direction and when the solenoid 182' is energized the input line 180a is coupled to the output 180b to rotate the motor in the opposite direction. When both solenoids 182 and 182' are de-energized the input line is disconnected from the output lines 180b and 180c.

Mounted for movement with the carriage frame 160 are actuating arms 184 and 186 which are moved opposite sensing means 185 and 187 respectively when the carriage frame 160 is respectively in its forwardmost and rearwardmost positions where the arms 24a—24a respectively are in retracted and extended positions.

The signal which initiates the energization of solenoid 182' to effect retraction of the pallet support arms 24a—24a is the actuation of sensing means 69a by actuating means 71 moved with the loaded pallet support frame 6 as the latter reaches its bottom position where the light beam of light and photocell means 65a–65b' or 65a–65b' (FIG. 4B) is re-established, indicating the absence of a pallet. The solenoid 182' becomes de-energized when the actuating arm 184 reaches the sensing means 185 (FIG. 4B).

The signal which initiates energization of the solenoid 182 which moves the pallet support arms 24a—24a to its extended position is generated when the loaded pallet support frame actuating means 71 is moved opposite the uppermost sensing means 69e and the light beam 79 and 79' thereat are both re-established indicating the absence of any cartons at the depalletizing station B. Energization of the solenoid 182 will start the rotation of the motor 178 in a direction which will move the pallet support arms 24a—24a to its extended position. The solenoid 182 is de-energized when the actuating arm 186 reaches the sensing means 187 (FIG. 4B).

When the pallet support arms 24a—24a are returned to their extended positions, the empty pallet previously carried on the support ledges 152—152 thereof will engage a pivotal dog 190 which permits movement of the pallet thereby as it moves to the right but presents an abutment edge 190a which engages the pallet and holds the same in its position above the pallet stacking station D. When the arms 24a—24a reach their extended positions, the pallet will be fully above the opening 158 previously described, where it will then fall upon the stack of empty pallets therebelow.

Means are provided for automatically lowering the stack of empty pallets one pallet thickness as the pallet is fed onto the stack of empty pallets, so there is always a clearance space to receive an empty pallet until a full pallet load is supported upon the previously mentioned pallet supporting channel members 26a—26a. As illustrated, while any suitable platform rising and lowering means may be utilized, channel members 26a—26a are shown on a platform 193 whose elevation is dependent upon the degree of extension of a piston rod 194b extending from a hydraulic cylinder 194a. The piston rod 194b carries on the end thereof a cam 196 which controls the degree of collapse of callapsible crossing frame members 198 and 200. As shown in FIG. 4C, hydraulic fluid output lines 202b and 202c of solenoid operated valve 202 respectively extend to the left and right hand ends of the hydraulic cylinder 194a. When a solenoid 204 is energized, a common hydraulic fluid input ine 202a will be connected to the left end of the hydraulic cylinder 194a through the output line 202b to effect a further extension of the piston rod 194b. When a solenoid 204' is energized, the input line 202a will be connected to the output line 202c to feed hydraulic fluid to the right end of the hydraulic cylinder 194a to effect progressive retraction of the piston rod 194b. When solenoids 204 and 204' are both de-energized, the input line 202a will be disconnected from the output lines 202b and 202c. The aforementioned computer logic circuit 64 will generate a signal which energizes the piston rod retracting solenoid 204' when the light beam generated by light and photocell means 192a and 192b is interrupted. This light beam is interrupted whenever a new pallet is delivered by the pallet stacking frame 24 to the top of a stack of empty pallets at the depalletizing station D, or upon the upper surfaces of the channel members 26 a—26a where the first pallet is delivered thereto. The channel members 26a—26a are initially raised to a desired uppermost position under control of an uppermost sensing means 206c which cooperates with an actuating arm 208 carried by a movable portion of the pallet support frame structure, such as the channel members 26a—26a or the platform 193 (FIG. 4A). When the actuating arm 208 reaches the uppermost sensing means 206c, the previously energized solenoid 204 controlling the flow of fluid to the left end of the hydraulic cylinder 194a will become de-energized. At that point, the light beam of the light and photocell means 192a–192b will be established but this beam will be interrupted by the feeding of a pallet upon the channel members 26a—26a which effects energization of the piston rod retracting solenoid 204' until the light beam is once again re-established as the pallet is lowered one pallet thickness.

When the channel members 26a—26a have been lowered to a point where the actuating arm 208 will be moved opposite the intermediate sensing means 206b (FIG. 4A), a signal is generated which disables any further operation of the portions of the machines which can effect the delivery of a pallet to the pallet stacking station, such as the movement of the loaded pallet support frame 6 or the pallet stacking frame 24.

The activation of the intermediate sensing means 206b also initiates a continued energization of the piston rod retracting solenoid 204' until the channel members 26a—26a reach their bottommost position where the actuating arm 208 thereof moves opposite and actuates the lowermost sensing means 206a and the fork lift unit-receiving space 27 defined between the channel shaped members 26a—26a is at an elevation to receive forklift arms which are to remove the stack of empty pallets thereabove.

The presence of the intermediate sensing means 206b which prevents further feeding of pallets upon the stack of pallets is necessary to provide a certain minimum vertical clearance space to enable the forklift unit to remove a stack of pallets from the channel-shaped members 26a—26a. Thus, when the fork lift arms enter the space 27 they must raise a distance (with clearance tolerances provided) fully to support the weight of the pallet stack to remove the same from the channel shaped members 26a—26a.

When the channel shaped members 26a—26a reach their lowermost position, the light beam of a light and photocell means 210a-210b on one side of the frame structure 2 or of a light and photocell means 210a'-210b' on the other side of the same is interrupted. When the fork lift arms completely removed the stack of pallets from the space 27, the previously interrupted light beams of the aforementioned light and photocell means 210a-210b or 210a'-210b' and 212a-212b or 212a'-212b' will be re-established, which result in the generation of a signal which effects the energization of the piston rod extending solenoid 204, progressively to raise the channel shaped members 206a—206a until the actuating arm 208 is moved opposite the uppermost sensing means 206c, where the solenoid 204 will become de-energized.

It should now be appreciated that the present invention provides an exceedingly compact, reliable and flexible pallet depalletizing and pallet stacking system. Also, it should be understood that numerous modifications may be made in the most preferred form of the invention described without deviating from the broader aspects of the invention.

We claim:

1. Article shuttle apparatus for moving one article or a row of articles bodily from one point to another, said one article of a row of articles to be moved thereby occupying a variable longitudinal extent due either to a varying number or size of the article or articles involved, said article shuttle apparatus including at least one pair of horizontally spaced clamping members, said horizontally spaced clamping members being respectively attached for bodily movement with a cylinder and a piston rod connected to a piston movable longitudinally within said cylinder, the cylinder being mounted on a horizontally movable frame so it and the clamping member attached thereto are supported for movement as a unit toward and away from the other clamping member, said pair of clamping members having initial relatively widely spaced apart positions located beyond the ends of the longest row of articles to be moved thereby and much closer spaced positions as close together as possible up to a minimum spacing point where less than the maximum number of articles can be clamped therebetween, and operating means for effecting movement of said frame and movement of the piston within said cylinder between an initial position in the cylinder where said clamping members have their maximum spacing and a second position in the cylinder where further movement is limited by the clamping engagement thereof with the article or articles involved.

2. The article shuttle apparatus of claim 1 wherein said cylinder is mounted for limited pivoting movement on said movable frame about a lateral horizontal axis.

3. The article shuttle apparatus of claim 1 wherein the article clamping members of each of said article gripping units are mounted for article hunting movement so each clamping member moves against the end of the nearest article removed to said position the minimum spacing.

4. Article shuttle apparatus for moving one article or a row of articles bodily from one point to another, said one article of a row of articles to be moved thereby occupying a variable longitudinal extent due either to a varying number or size of the article or articles involved, said article shuttle apparatus including a pair of horizontally spaced clamping members, each clamping member being supported for movement toward and away from the other clamping member, said pair of clamping members in a first condition of operation of the apparatus having initial relatively widely spaced apart positions located beyond the ends of the longest row of articles to be moved thereby and in a second condition of operation of the apparatus having positions as close together as possible up to a minimum spacing point where less than the maximum number of articles can be clamped therebetween, said clamping members being associated with other elements so that one of the clamping members and its associated elements are substantially heavier than the other clamping member and its associated elements, spring loaded push-off means associated with the heavier clamping member and associated elements, said push-off means being under spring tension when said clamping members are in their maximum spaced apart positions located beyond the ends of the longest row of articles and imparting a force to the latter clamping member to move the same toward the other clamping member when released for movement toward the same, and means for operating said article shuttle apparatus from said first to said second condition of operation and, after the articles involved are clamped therebetween, to carry the clamped article to a discharge point.

5. Article shuttle apparatus for bodily moving from one point to another a plurality of rectangular articles arranged in contiguous rows, where each row of articles can include one or more articles occupying a variable longitudinal extent due to a varying number or size of the articles, said shuttle apparatus including shuttle carriage means supporting therein laterally spaced article gripping units each including a pair of horizontally spaced article clamping members each of which is movable independently of all of the other clamping members between a position where it is spaced a maximum degree from the associated clamping member so the pair thereof have a maximum separation where they are located beyond the ends of the longest associated row of articles to be engaged thereby and a position of minimum separation where each clamping member is moved horizontally to the fullest extent possible toward the other clamping member of each pair thereof up to a minimum spacing point where less than a maximum number of articles can be clamped thereby, clamping member moving means having a first condition for driving both clamping members of each gripping unit at a controllable moment from said first position of maximum spacing toward a position of minimum spacing to the extent permitted by the articles to be clamped thereby and having a second condition for returning the same to said position of maximum spacing at a controllable moment, means for moving said shuttle carriage means from a pick-up point to a discharge station, and control means for operating said clamping member moving means from said second condition to said first condition when the articles are in position to be grasped by said clamping members at said pick-up point and for operating said clamping member moving means from said first condition to said second condition when said carriage is at said discharge station.

6. Article shuttle apparatus for bodily moving from one point to another a plurality of rectangular articles arranged in contiguous rows, where each row of articles can include one or more articles occupying a variable longitudinal extent due to a varying number of size of the articles, said shuttle apparatus including shuttle carriage means supporting therein laterally spaced article gripping units each including a pair of horizontally spaced article clamping members, each of the clamping members being supported on a carriage frame guided for horizontal longitudinal movement within tracks formed in the shuttle carriage means framework so each of the clamping members is movable independently of all of the other clamping members between a position where it is spaced a maximum degree from the associated clamping member so the pair thereof are located beyond the ends of the longest associated row of articles to be engaged thereby and a position of minimum separation where each clamping member is moved horizontally to the fullest extent possible toward the other clamping member of each pair thereof up to a minimum spacing point where less than a maximum number of articles can be clamped thereby, clamping member operating means for moving said clamping members of each gripping unit from said position of maximum spacing toward a position of minimum spacing to the extent permitted by the articles to be clamped thereby and for returning the same to said position of maximum spacing, and means for moving said shuttle carriage means from a pick-up point to a discharge station while said article clamping members remain in said position of minimum spacing, the articles being released by said clamping members when the main carriage reaches said discharge station.

7. The article shuttle apparatus of claim 6 wherein each pair of horizontally spaced clamping members are respectively attached to a cylinder and a piston rod connected to a piston longitudinally movable within said cylinder, said piston rod and cylinder being respectively secured to the track guided carriage frames associated with said clamping members.

8. The article shuttle apparatus of claim 7 wherein each of said cylinders is connected to the associated track guided carriage frame through a connection permitting limited pivotal movement about a lateral horizontal axis.

9. The article shuttle apparatus of claim 6 wherein each of said horizontally spaced pair of clamping members are respectively attached to a hydraulic cylinder and a piston rod connected to a piston moveable longitudinally within said cylinder; said clamping member operating means including means for feeding hydraulic fluid into each of said cylinders on one side or the other of said piston where the piston rod can be moved to an extended or retracted position; said shuttle carriage means having longitudinally spaced abutment shoulder-forming means; each pair of clamping members and the associated piston rod and cylinder being respectively connected to separate carriage frames guided for movement in tracks formed in the shuttle carriage means, whereby the piston rod clamping member carried thereby and the associated carriage frame moves horizontally together as a unit; and the other clamping member, said hydraulic cylinder and the associated carriage frame move together as a unit; means respectively associated with each associated pair of track guided carriage frames which engage said abutment shoulder-forming means when said clamping members are at or in the vicinity of said position of maximum spacing; conduit means interconnecting the corresponding ends of said hydraulic cylinders together so that they can be respectively fed from a common source of hydraulic fluid under pressure; a common hydraulic input line, valve means selectively interconnecting said common input line to one end or the other of said hydraulic cylinder; the carriage frames associated with said hydraulic cylinders each carrying spring loaded pusher means which engage one of said shoulder-forming abutment means where they are compressed thereagainst when the pressure in said common hydraulic input line raises to a given value indicating that all of said spring loaded pusher means are simultaneously engaging said shoulder-forming abutment means; and said means for moving said clamping members from said position in the path of movement of said articles on said conveyor to said other position thereof being operable when all of said spring loaded pusher means are compressed simultaneously by the presence of said given pressure.

10. Article shuttle apparatus for bodily moving from one point to another a plurality of rectangular articles arranged in contiguous rows, where each row of articles can include one or more articles occupying a variable longitudinal extent due to a varying number or size of the articles, said shuttle apparatus including shuttle carriage means supporting therein laterally spaced article gripping units each including a pair of horizontally spaced article clamping members each of which is movable between a position where it is spaced a maximum degree from the associated clamping member so the pair thereof are located beyond the ends of the longest associated row of articles to be engaged thereby and a position of minimum separation where each clamping member is moved horizontally to the fullest extent possible toward the other clamping member of each pair thereof up to a minimum spacing point where less than a maximum number of articles can be clamped thereby, clamping member operating means for moving said clamping member of each gripping unit from said first position of maximum spacing toward a position of minimum spacing to the extent permitted by the articles to be clamped thereby and for returning the same to said position of maximum spacing, means for moving said shuttle carriage means from a pick-up point to a discharge station while said article clamping members remain in said position of minimum spacing, the articles being released by said clamping members when the main carriage reaches said discharge station, and there is provided beneath said discharge station a conveyor for receiving the articles discharged thereat and impelling the same horizontally in a given direction, each pair of horizontally spaced article clamping members when moved by the shuttle carriage means to said discharge station being spaced apart in a direction parallel to said given direction, the clamping member of each pair of clamping members which is spaced from the associated clamping member at said discharge station in the direction in which the articles are moved on said conveyor being movable after further separation from the associated clamping member from a position where it is in the path of movement of the articles dropped on said conveyor to a position where it is out of the path of movement thereof, and said clamping member operating means being operable to separate each of said pairs of clamping members at said discharge point at a speed less than the speed at which said conveyor moves said articles thereon, so the articles are moved against the forwardmost associated clamping members, and there is provided means responsive to the movement of the latter forwardmost clamping members at said discharge station to corresponding positions along a line transverse to the direction of movement of the articles on said conveyor by moving said latter clamping members from said position in the path of movement of said articles on said conveyor to said position out of the path of movement thereof where the then laterally aligned articles thereagainst are free to be moved at the speed of the conveyor.

11. Article shuttle apparatus for bodily moving from one point to another in a given direction a plurality of rectangular articles arranged in contiguous rows, where each row of articles can include one or more articles occupying a variable longitudinal extent in said given direction due to a varying number or size of the articles, said shuttle apparatus including shuttle carriage means supporting therein laterally spaced article gripping units each including a pair of horizontally spaced article clamping members each of which is movable independently of all of the other clamping members between an initial position where it is spaced a maximum degree from the associated clamping member in said given direction so the pair thereof are located beyond the ends of the longest associated row of articles to be engaged thereby and a position of minimum separation where each clamping members is moved horizontally to the fullest extent possible toward the other clamping member of each pair thereof up to a minimum spacing point where less than a maximum number of articles can be clamped thereby, clamping member moving means having a first condition for driving both of said clamping members of each gripping unit at a controllable moment from said first position of maximum spacing toward a position of minimum spacing to the extent permitted by the articles to be clamped thereby and having a second condition for returning the same to said position of maximum spacing at a controllable moment, and means for moving said shuttle carriage means from a pick-up point to a discharge station while said article clamping members remain in said position of minimum spacing, and control means for operating said clamping member moving means from said second condition to said first condition when the articles are in position to be grasped by said clamping member at said pick-up point and for operating said clamping member moving means from said first condition to said second condition when said carriage is at said discharge station.

12. The article shuttle apparatus of claim 11 wherein there is provided means for aligning at least one of the corresponding clamping members of each of said article gripping units along a line transverse to said longitudinal rows before the articles are completely released from the article clamping members, wherein the articles are aligned for removal from said discharge station.

13. The article shuttle apparatus of claim 12 wherein there is provided at said discharge station a conveyor for moving the articles in a direction transverse to said direction of lateral alignment of the articles thereat, a conveyor delivering the articles delivered at the discharge station to an article separator station, and means of said article separator station for separating contiguous lateral rows of said articles from one another and the articles in each lateral row of articles from one another.

* * * * *